United States Patent
Kuwabara

(10) Patent No.: US 7,199,389 B2
(45) Date of Patent: Apr. 3, 2007

(54) RADIATION IMAGE RECORDING AND READ-OUT METHOD AND SYSTEM

(75) Inventor: Takao Kuwabara, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 168 days.

(21) Appl. No.: 11/091,393

(22) Filed: Mar. 29, 2005

(65) Prior Publication Data

US 2005/0211932 A1 Sep. 29, 2005

(30) Foreign Application Priority Data

Mar. 29, 2004 (JP) .............................. 2004-095497

(51) Int. Cl.
G03B 42/08 (2006.01)
(52) U.S. Cl. ..................................... 250/588
(58) Field of Classification Search ................. 250/588
See application file for complete search history.

(56) References Cited

U.S. PATENT DOCUMENTS 4,695,726 A * 9/1987 Watanabe et al. ........... 250/582
4,755,672 A * 7/1988 Watanabe et al. ........... 250/587

FOREIGN PATENT DOCUMENTS

JP 6-14909 A 1/1994

* cited by examiner

Primary Examiner—Constantine Hannaher
(74) Attorney, Agent, or Firm—Sughrue Mion, PLLC

(57) ABSTRACT

A residual image signal, which represents a residual image remaining on a stimulable phosphor sheet having been subjected to an erasing operation, is acquired. A radiation image of an object is then recorded on the stimulable phosphor sheet, from which the residual image signal has been detected. A radiation image signal, which represents the radiation image of the object, is then acquired, the thus acquired radiation image signal containing a residual image signal, which represents the residual image. The residual image signal is subtracted from the radiation image signal, and a radiation image signal, which represents the radiation image of the object and which is free from the residual image signal, is acquired.

52 Claims, 8 Drawing Sheets

FIRST EXAMPLE OF A PROCEDURE
(IN CASES WHERE A RESERVATION FOR A NEXT RADIATION IMAGE RECORDING OPERATION HAS BEEN MADE)

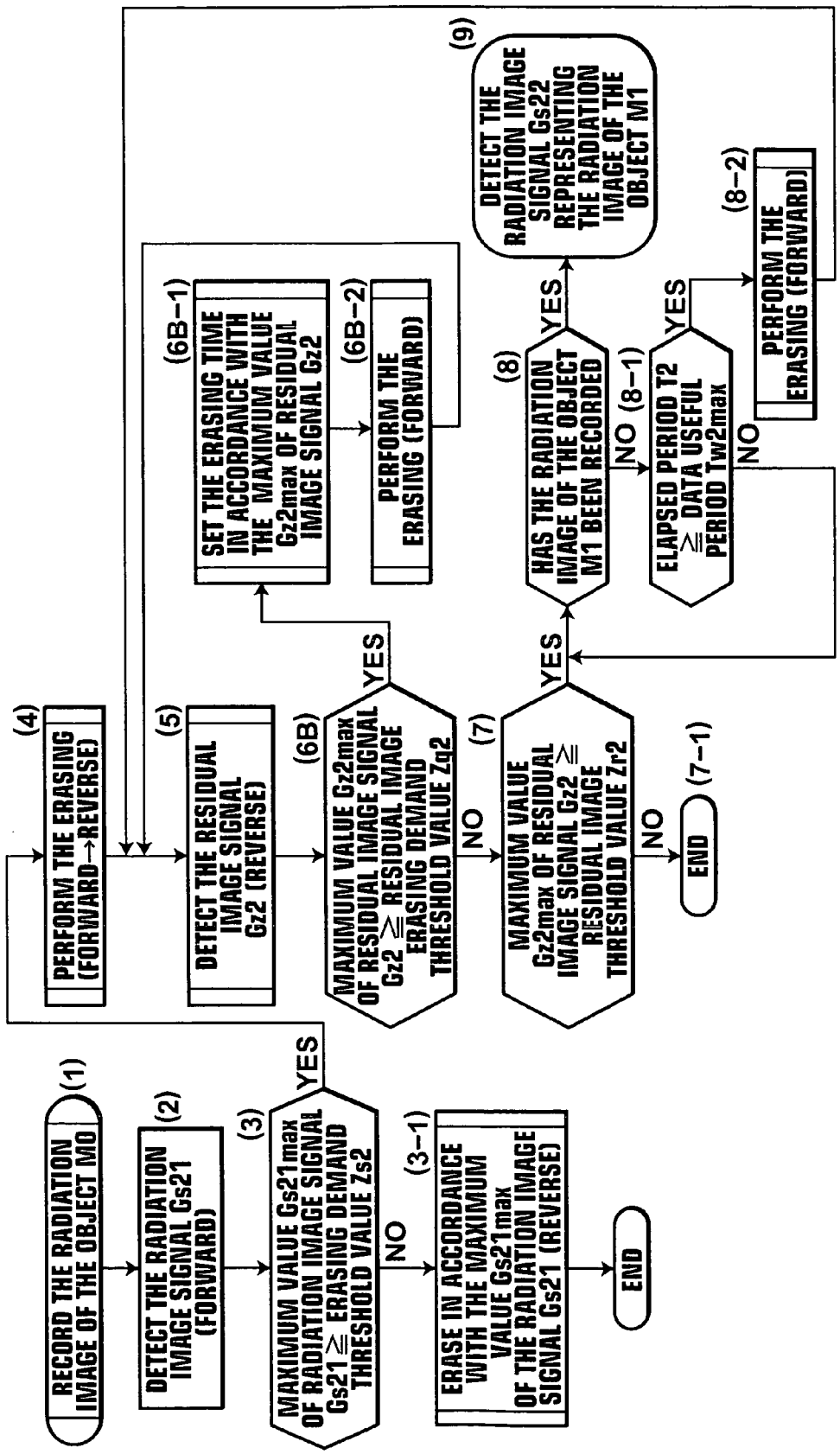

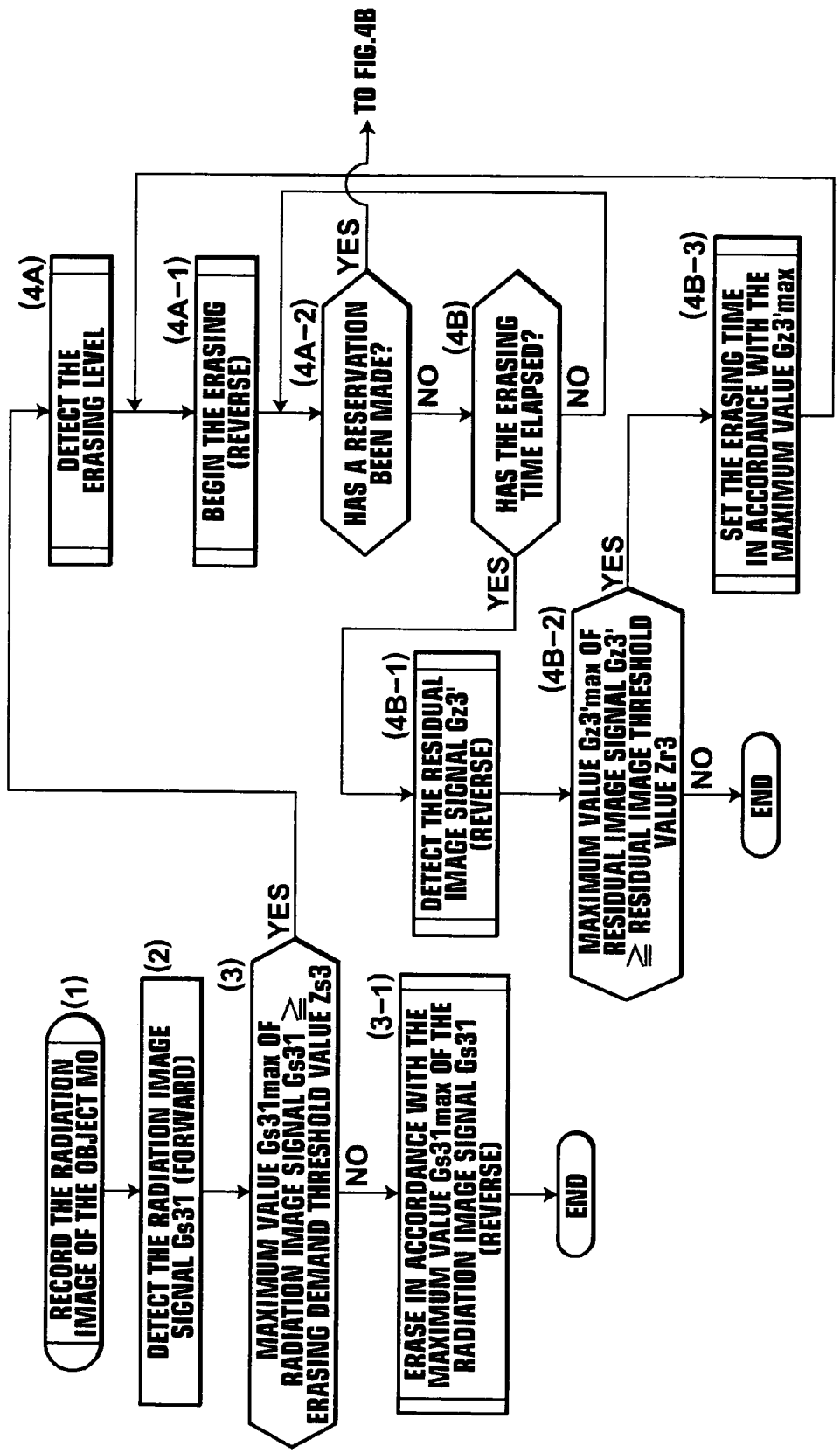

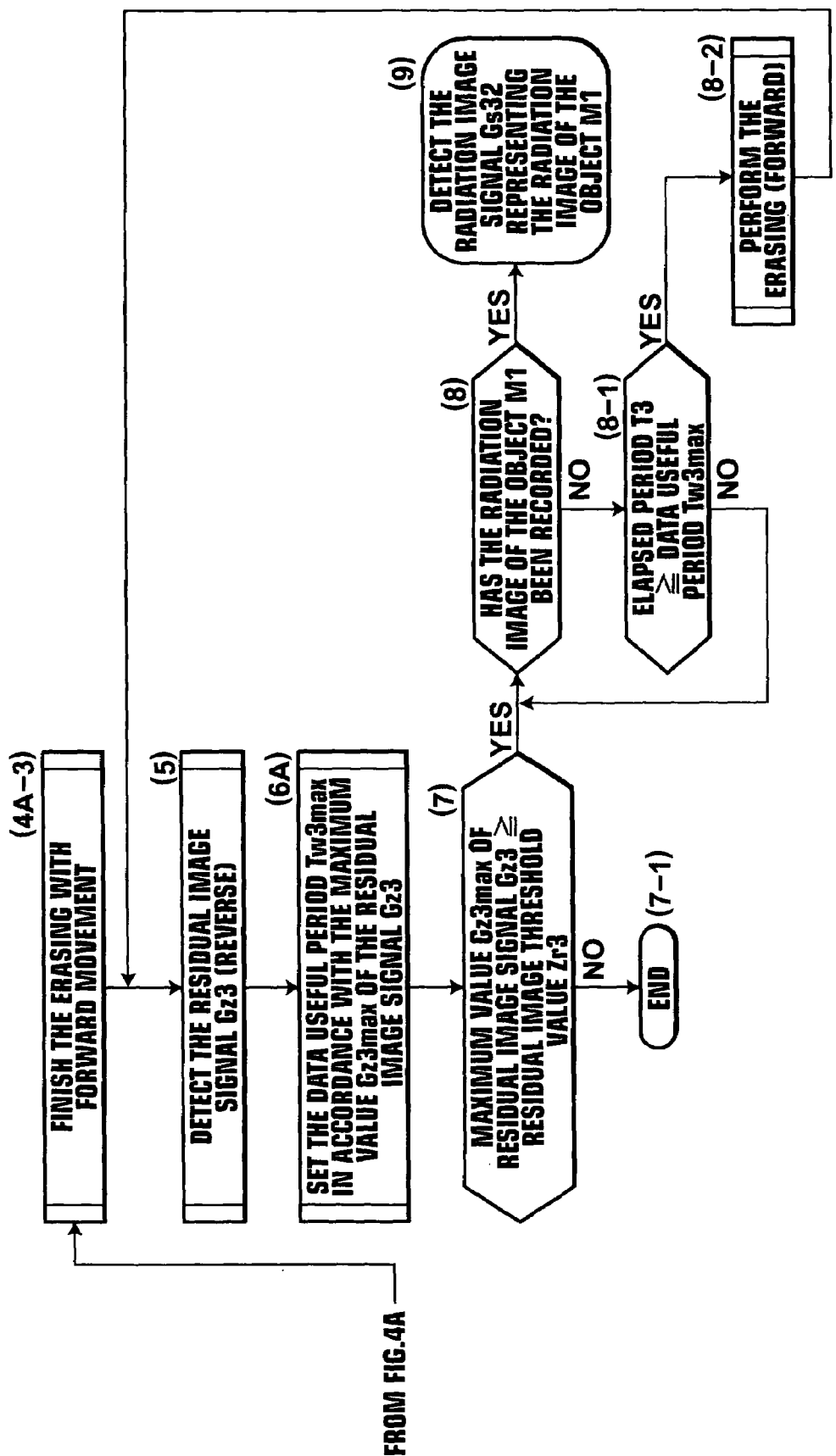

RADIATION IMAGE RECORDING AND READ-OUT METHOD AND SYSTEM

BACKGROUND OF THE INVENTION

1. Field of the Invention

This invention relates to a radiation image recording and read-out method and system. This invention particularly relates to a radiation image recording and read-out method and system, wherein a residual image remaining on a stimulable phosphor sheet is removed in a radiation image recording and read-out system for iterately performing a radiation image recording operation for recording a radiation image of an object, a radiation image read-out operation, and an erasing operation on an identical stimulable phosphor sheet.

2. Description of the Related Art

Radiation image recording and reproducing systems utilizing stimulable phosphors have heretofore been known. With the radiation image recording and reproducing systems utilizing the stimulable phosphors, radiation carrying image information of an object is irradiated to a sheet containing a stimulable phosphor (hereinbelow referred to as the stimulable phosphor sheet), and a radiation image of the object is thus stored on the stimulable phosphor sheet. The stimulable phosphor sheet, on which the radiation image has been stored, is then exposed to stimulating rays, such as a laser beam, which cause the stimulable phosphor sheet to emit light in proportion to the amount of energy stored on the stimulable phosphor sheet during the exposure of the stimulable phosphor sheet to the radiation. The light emitted by the stimulable phosphor sheet is photoelectrically detected, and an image signal representing the radiation image of the object is thereby acquired.

In the radiation image recording and reproducing systems described above, after the radiation image has been read out from the stimulable phosphor sheet, erasing light having wavelengths falling within a wavelength range of visible light is irradiated to the stimulable phosphor sheet, and residual radiation energy remaining on the stimulable phosphor sheet is thereby released. The thus erased stimulable phosphor sheet is again used for the recording of a radiation image.

In such cases, it often occurs that, on the erased stimulable phosphor sheet from which the residual radiation energy has been released, part of the residual radiation energy remains even further without being released perfectly during the erasing operation. The residual radiation energy remaining even further on the stimulable phosphor sheet without being released perfectly during the erasing operation is the energy due to the radiation image, which was recorded on the stimulable phosphor sheet in the manner described above. If the energy level of the residual radiation energy remaining even further on the stimulable phosphor sheet without being released perfectly during the erasing operation is higher than a negligible level, and the stimulable phosphor sheet, on which the energy level of the residual radiation energy is higher than the negligible level, is subjected to a next radiation image recording operation for the recording of a radiation image of an object, the residual radiation energy remaining on the stimulable phosphor sheet will cause a residual image to occur in a radiation image, which is reproduced from an image signal having been read out from the stimulable phosphor sheet having been subjected to the next radiation image recording operation. The residual image constitutes noise in the reproduced radiation image.

As a technique for rendering the residual image imperceptible, a technique utilizing offset processing has been proposed in, for example, Japanese Unexamined Patent Publication No. 6(1994)-014909. With the proposed technique utilizing the offset processing, the offset processing for setting values of image signal components of an image signal, which has been acquired from a stimulable phosphor sheet, to be large is performed on the image signal. In this manner, the contrast of a residual image represented by residual image components, which are constituted of the image signal components having comparatively small values, is set to be low, and the residual image is thereby rendered imperceptible in the image reproduced from the image signal.

However, with the proposed technique utilizing the offset processing, the values of the image signal components of the image signal are set to be large uniformly without discriminations being made between the image signal components, which represent the radiation image of an object, and the image signal components, which represent the residual image. Therefore, the problems occur in that, in cases where the image signal components of the image signal, which image signal components represent the radiation image of the object, are constituted of small values, the contrast of the image reproduced from the image signal becomes low, and the image quality of the radiation image of the object becomes bad.

SUMMARY OF THE INVENTION

The primary object of the present invention is to provide a radiation image recording and read-out method, wherein image signal components representing a residual image, which image signal components are contained in an image signal representing a radiation image of an object, are capable of being removed such that image quality of an image reproduced from the image signal may not become bad.

Another object of the present invention is to provide a radiation image recording and read-out method, wherein image signal components representing a residual image, which image signal components are contained in an image signal representing a radiation image of an object, are capable of being removed such that image quality of an image reproduced from the image signal may not become bad, and wherein radiation image recording and read-out operations are capable of being performed efficiently.

A further object of the present invention is to provide a system for carrying out the radiation image recording and read-out method.

The present invention provides a first radiation image recording and read-out method for use in a radiation image recording and read-out system, in which a radiation image recording operation for recording a radiation image of an object, a radiation image read-out operation, and an erasing operation are performed iterately on an identical stimulable phosphor sheet, the method comprising the steps of:

i) performing a residual image read-out operation on the stimulable phosphor sheet, which has been subjected to the erasing operation, a residual image signal, which represents a residual image remaining on the stimulable phosphor sheet after the stimulable phosphor sheet has been subjected to the erasing operation, being thereby acquired, ii) performing a radiation image recording operation for recording a radiation image of an object on the stimulable phosphor sheet, which has been subjected to the residual image read-out operation, iii) performing a radiation image read-out operation on the stimulable phosphor sheet, on which the radiation image of the object has been recorded, a radiation image signal, which represents the radiation image of the object, being thereby acquired, the thus acquired radiation image signal containing a residual image signal, which represents the residual image, and iv) subtracting the residual image signal, which represents the residual image, from the radiation image signal, which represents the radiation image of the object and which contains the residual image signal, whereby a radiation image signal, which represents the radiation image of the object and which is free from the residual image signal, is acquired.

The present invention also provides a second radiation image recording and read-out method for use in a radiation image recording and read-out system, in which a radiation image recording operation for recording a radiation image of an object, a radiation image read-out operation, and an erasing operation are performed iteratively on an identical stimulable phosphor sheet, the method comprising the steps of:

i) performing a residual image read-out operation on the stimulable phosphor sheet, which has been subjected to the erasing operation, a residual image signal, which represents a residual image remaining on the stimulable phosphor sheet after the stimulable phosphor sheet has been subjected to the erasing operation, being thereby acquired, ii) performing a radiation image recording operation for recording a radiation image of an object on the stimulable phosphor sheet, which has been subjected to the residual image read-out operation, iii) performing a radiation image read-out operation on the stimulable phosphor sheet, on which the radiation image of the object has been recorded, a radiation image signal, which represents the radiation image of the object, being thereby acquired, the thus acquired radiation image signal containing a residual image signal, which represents the residual image, iv) measuring an elapsed period that has elapsed between when the residual image read-out operation was performed on the stimulable phosphor sheet, which had been subjected to the erasing operation, and when the radiation image read-out operation is performed on the stimulable phosphor sheet, which has been subjected to the radiation image recording operation for recording the radiation image of the object on the stimulable phosphor sheet having been subjected to the residual image read-out operation, v) storing information, which represents a residual image decay rate representing a rate of decay of the residual image on the stimulable phosphor sheet, vi) multiplying the residual image signal, which has been acquired with the residual image read-out operation, by the residual image decay rate, which has been stored and takes a value in accordance with the elapsed period having been measured, and vii) subtracting the residual image signal, which has been acquired with the multiplication by the residual image decay rate, from the radiation image signal, which represents the radiation image of the object and has been acquired with the radiation image read-out operation performed on the stimulable phosphor sheet having been subjected to the radiation image recording operation for recording the radiation image of the object on the stimulable phosphor sheet having been subjected to the residual image read-out operation, the radiation image signal containing a residual image signal, which represents the residual image having decayed in accordance with the elapsed period, whereby a radiation image signal, which represents the radiation image of the object and which is free from the residual image signal representing the residual image having decayed, is acquired.

Each of the first and second radiation image recording and read-out methods in accordance with the present invention should preferably be modified such that the radiation image read-out operation and the residual image read-out operation are performed with single same read-out means.

Also, each of the first and second radiation image recording and read-out methods in accordance with the present invention may be modified such that a detection is made as to whether a reservation for a next radiation image recording operation has or has not been made, the erasing operation is performed for a short length of time in cases where it has been detected that the reservation for the next radiation image recording operation has been made, and the erasing operation is performed for a long length of time, which is longer than the short length of time, in cases where it has been detected that the reservation for the next radiation image recording operation has not been made.

In such cases, the erasing operation for the long length of time should preferably be performed such that the operation for removing the residual image signal may be omitted.

Further, each of the first and second radiation image recording and read-out methods in accordance with the present invention may be modified such that a detection is made as to whether a reservation for a next radiation image recording operation has or has not been made, the erasing operation is ceased midway in cases where it has been detected during the erasing operation that the reservation for the next radiation image recording operation has been made, and the residual image read-out operation is performed on the stimulable phosphor sheet, for which the erasing operation has been ceased midway.

Furthermore, each of the first and second radiation image recording and read-out methods in accordance with the present invention may be modified such that an elapsed period, which has elapsed after the residual image read-out operation was performed on the stimulable phosphor sheet, is measured, information representing a predetermined update period for the updating of the residual image signal, which represents the residual image, is stored, a detection is made as to whether a radiation image recording operation has or has not been performed after the residual image read-out operation was performed on the stimulable phosphor sheet, and the residual image read-out operation is again performed on the stimulable phosphor sheet when the elapsed period, which has elapsed after the residual image read-out operation was performed on the stimulable phosphor sheet and which has been measured, has become longer than the predetermined update period, which is stored, in cases where it has been detected that the radiation image recording operation has not been performed after the residual image read-out operation was performed on the stimulable phosphor sheet, whereby the residual image signal, which represents the residual image, is updated.

In such cases, each of the first and second radiation image recording and read-out methods in accordance with the present invention may be modified such that the predetermined update period, which is to be stored, is set to be long as a representative value of the residual image signal, which represents the residual image, becomes large.

Also, each of the first and second radiation image recording and read-out methods in accordance with the present invention may be modified such that information representing an erasing demand threshold value, which acts as a criterion for a demand for the erasing operation, is stored, and the erasing operation is performed in cases where a representative value of the residual image signal, which represents the residual image and has been acquired with the residual image read-out operation performed on the stimulable phosphor sheet, is equal to at least the erasing demand threshold value, which is stored.

Further, each of the first and second radiation image recording and read-out methods in accordance with the present invention may be modified such that information representing a residual image threshold value, which acts as a criterion for omission of the operation for removing the residual image signal, is stored, and the operation for removing the residual image signal is omitted in cases where a representative value of the residual image signal, which represents the residual image and has been acquired with the residual image read-out operation performed on the stimulable phosphor sheet, is smaller than the residual image threshold value, which is stored.

In such cases, the representative value of the residual image signal, which represents the residual image, may be a value of a residual image signal component corresponding to a rank, at which a cumulative frequency of occurrence taken from a maximum value side with respect to a total frequency of occurrence of a histogram constituted of the values of the residual image signal components of the residual image signal is equal to a predetermined frequency of occurrence.

Alternatively, the representative value of the residual image signal, which represents the residual image, may be a maximum value of a processed residual image signal, which is acquired with running mean processing of the residual image signal and removal of high frequency components.

Furthermore, each of the first and second radiation image recording and read-out methods in accordance with the present invention may be modified such that a length of time of the erasing operation, and/or the erasing demand threshold value, and/or the residual image threshold value, and/or the update period is altered in accordance with radiation image recording conditions employed in a next radiation image recording operation.

In each of the first and second radiation image recording and read-out methods in accordance with the present invention, the erasing demand threshold value is the predetermined value, which acts as the criterion for the demand for the erasing operation.

Also, in each of the first and second radiation image recording and read-out methods in accordance with the present invention, the residual image threshold value is the predetermined value, which acts as the criterion for omission of the operation for removing the residual image signal, and which acts as the criterion for allowing the use of the stimulable phosphor sheet in the next radiation image recording operation.

The present invention further provides a first radiation image recording and read-out system, comprising:

i) radiation image recording means for performing a radiation image recording operation for recording a radiation image of an object on a stimulable phosphor sheet, ii) radiation image read-out means for performing a radiation image read-out operation on the stimulable phosphor sheet, on which the radiation image of the object has been recorded, and thereby acquiring a radiation image signal, which represents the radiation image of the object, and iii) erasing means for performing an erasing operation on the stimulable phosphor sheet, which has been subjected to the radiation image read-out operation performed by the radiation image read-out means, the radiation image recording operation, the radiation image read-out operation, and the erasing operation being performed iteratively on the identical stimulable phosphor sheet, wherein the improvement comprises the provision of:

a) residual image read-out means for performing a residual image read-out operation on the stimulable phosphor sheet, which has been subjected to the erasing operation performed by the erasing means, and thereby acquiring a residual image signal, which represents a residual image remaining on the stimulable phosphor sheet after the stimulable phosphor sheet has been subjected to the erasing operation, and b) residual image signal removing means for operating such that:

the residual image signal removing means receives the residual image signal, which represents the residual image and has been acquired with the residual image read-out means, and the radiation image signal, which represents the radiation image of the object and has been acquired with the radiation image read-out operation performed by the radiation image read-out means and on the stimulable phosphor sheet having been subjected to the radiation image recording operation performed by the radiation image recording means for recording the radiation image of the object on the stimulable phosphor sheet having been subjected to the residual image read-out operation, the radiation image signal containing the residual image signal, which represents the residual image, and the residual image signal removing means subtracts the residual image signal, which represents the residual image, from the radiation image signal, which represents the radiation image of the object and which contains the residual image signal, in order to acquire a radiation image signal, which represents the radiation image of the object and which is free from the residual image signal.

The present invention still further provides a second radiation image recording and read-out system, comprising:

i) radiation image recording means for performing a radiation image recording operation for recording a radiation image of an object on a stimulable phosphor sheet, ii) radiation image read-out means for performing a radiation image read-out operation on the stimulable phosphor sheet, on which the radiation image of the object has been recorded, and thereby acquiring a radiation image signal, which represents the radiation image of the object, and iii) erasing means for performing an erasing operation on the stimulable phosphor sheet, which has been subjected to the radiation image read-out operation performed by the radiation image read-out means, the radiation image recording operation, the radiation image read-out operation, and the erasing operation being performed iteratively on the identical stimulable phosphor sheet, wherein the improvement comprises the provision of:

a) residual image read-out means for performing a residual image read-out operation on the stimulable phosphor sheet, which has been subjected to the erasing operation performed by the erasing means, and thereby acquiring a residual image signal, which represents a residual image remaining on the stimulable phosphor sheet after the stimulable phosphor sheet has been subjected to the erasing operation, b) elapsed period measuring means for measuring an elapsed period that has elapsed between when the residual image read-out operation was performed by the residual image read-out means and on the stimulable phosphor sheet, which had been subjected to the erasing operation, and when the radiation image read-out operation is performed by the radiation image read-out means and on the stimulable phosphor sheet, which has been subjected to the radiation image recording operation performed by the radiation image recording means for recording the radiation image of the object on the stimulable phosphor sheet having been subjected to the residual image read-out operation performed by the residual image read-out means, c) storage means for storing information, which represents a residual image decay rate representing a rate of decay of the residual image on the stimulable phosphor sheet, and d) residual image signal removing means for operating such that:

the residual image signal removing means receives the residual image signal, which represents the residual image and has been acquired with the residual image read-out means, and the radiation image signal, which represents the radiation image of the object and has been acquired with the radiation image read-out operation performed by the radiation image read-out means and on the stimulable phosphor sheet having been subjected to the radiation image recording operation performed by the radiation image recording means for recording the radiation image of the object on the stimulable phosphor sheet having been subjected to the residual image read-out operation performed by the residual image read-out means, the radiation image signal containing the residual image signal, which represents the residual image having decayed in accordance with the elapsed period, the residual image signal removing means multiplies the residual image signal, which has been acquired with the residual image read-out operation performed by the residual image read-out means, by the residual image decay rate, which has been stored in the storage means and takes a value in accordance with the elapsed period having been measured by the elapsed period measuring means, and the residual image signal removing means subtracts the residual image signal, which has been acquired with the multiplication by the residual image decay rate, from the radiation image signal, which represents the radiation image of the object and has been acquired with the radiation image read-out operation performed by the radiation image read-out means, the radiation image signal containing a residual image signal, which represents the residual image having decayed in accordance with the elapsed period, in order to acquire a radiation image signal, which represents the radiation image of the object and which is free from the residual image signal representing the residual image having decayed.

Each of the first and second radiation image recording and read-out systems in accordance with the present invention should preferably be modified such that the radiation image read-out means also acts as the residual image read-out means.

Also, each of the first and second radiation image recording and read-out systems in accordance with the present invention may be modified such that the system further comprises reservation detecting means for making a detection as to whether a reservation for a next radiation image recording operation has or has not been made, and control means for controlling such that:

the erasing means performs the erasing operation for a short length of time in cases where it has been detected by the reservation detecting means that the reservation for the next radiation image recording operation has been made, and the erasing means performs the erasing operation for a long length of time, which is longer than the short length of time, in cases where it has been detected by the reservation detecting means that the reservation for the next radiation image recording operation has not been made.

In such cases, the erasing operation for the long length of time should preferably be performed such that the operation of the residual image signal removing means for removing the residual image signal may be omitted.

Further, each of the first and second radiation image recording and read-out systems in accordance with the present invention may be modified such that the system further comprises reservation detecting means for making a detection as to whether a reservation for a next radiation image recording operation has or has not been made, and control means for controlling such that:

the erasing operation is ceased midway in cases where it has been detected by the reservation detecting means during the erasing operation, which is being performed by the erasing means, that the reservation for the next radiation image recording operation has been made, and the residual image read-out means performs the residual image read-out operation on the stimulable phosphor sheet, for which the erasing operation has been ceased midway.

Furthermore, each of the first and second radiation image recording and read-out systems in accordance with the present invention may be modified such that the system further comprises period measuring means for measuring an elapsed period, which has elapsed after the residual image read-out operation was performed by the residual image read-out means and on the stimulable phosphor sheet, update period storing means for storing information representing a predetermined update period for the updating of the residual image signal, which represents the residual image, image recording operation detecting means for making a detection as to whether a radiation image recording operation has or has not been performed by the radiation image recording means after the residual image read-out operation was performed by the residual image read-out means and on the stimulable phosphor sheet, and control means for controlling such that:

the residual image read-out means again performs the residual image read-out operation on the stimulable phosphor sheet when the elapsed period, which has elapsed after the residual image read-out operation was performed on the stimulable phosphor sheet and which has been measured by the period measuring means, has become longer than the predetermined update period, which is stored in the update period storing means, in cases where it has been detected by the image recording operation detecting means that the radiation image recording operation has not been performed after the residual image read-out operation was performed on the stimulable phosphor sheet, whereby the residual image signal, which represents the residual image, is updated.

In such cases, each of the first and second radiation image recording and read-out systems in accordance with the present invention may be modified such that the system further comprises update period setting means for setting the predetermined update period, which is to be stored in the update period storing means, and the update period setting means sets the update period to be long as a representative value of the residual image signal, which represents the residual image and has been acquired with the residual image read-out means, becomes large.

Also, each of the first and second radiation image recording and read-out systems in accordance with the present invention may be modified such that the system further comprises erasing demand threshold value storing means for storing information representing an erasing demand threshold value, which acts as a criterion for a demand for the erasing operation performed by the erasing means, and control means for controlling such that:

the erasing means performs the erasing operation in cases where a representative value of the residual image signal, which represents the residual image and has been acquired with the residual image read-out operation performed by the residual image read-out means and on the stimulable phosphor sheet, is equal to at least the erasing demand threshold value, which is stored in the erasing demand threshold value storing means.

Further, each of the first and second radiation image recording and read-out systems in accordance with the present invention may be modified such that the system further comprises residual image threshold value storing means for storing information representing a residual image threshold value, which acts as a criterion for omission of the operation of the residual image signal removing means for removing the residual image signal, and control means for controlling such that:

the operation of the residual image signal removing means for removing the residual image signal is omitted in cases where a representative value of the residual image signal, which represents the residual image and has been acquired with the residual image read-out operation performed by the residual image read-out means and on the stimulable phosphor sheet, is smaller than the residual image threshold value, which is stored in the residual image threshold value storing means.

In such cases, the representative value of the residual image signal, which represents the residual image, may be a value of a residual image signal component corresponding to a rank, at which a cumulative frequency of occurrence taken from a maximum value side with respect to a total frequency of occurrence of a histogram constituted of the values of the residual image signal components of the residual image signal is equal to a predetermined frequency of occurrence. Alternatively, the representative value of the residual image signal, which represents the residual image, may be a maximum value of a processed residual image signal, which is acquired with running mean processing of the residual image signal and removal of high frequency components.

Furthermore, each of the first and second radiation image recording and read-out systems in accordance with the present invention may be modified such that the system further comprises control means for altering a length of time of the erasing operation, and/or the erasing demand threshold value, and/or the residual image threshold value, and/or the update period in accordance with radiation image recording conditions employed in a next radiation image recording operation performed by the radiation image recording means.

In each of the first and second radiation image recording and read-out systems in accordance with the present invention, the erasing demand threshold value is the predetermined value, which acts as the criterion for the demand for the erasing operation performed by the erasing means.

Also, in each of the first and second radiation image recording and read-out systems in accordance with the present invention, the residual image threshold value is the predetermined value, which acts as the criterion for omission of the operation of the residual image signal removing means for removing the residual image signal, and which acts as the criterion for allowing the use of the stimulable phosphor sheet in the next radiation image recording operation.

With the first radiation image recording and read-out method and system in accordance with the present invention, the residual image signal, which represents the residual image, is subtracted from the radiation image signal, which represents the radiation image of the object and which contains the residual image signal, and the radiation image signal, which represents the radiation image of the object and which is free from the residual image signal, is thereby acquired. Therefore, the residual image signal, which represents the residual image, is capable of being discriminated from the radiation image signal, which represents the radiation image of the object, and the residual image signal is capable of being removed. Accordingly, the residual image signal is capable of being removed such that the image quality of the reproduced radiation image of the object may not become bad.

With the second radiation image recording and read-out method and system in accordance with the present invention, the residual image signal, which has been acquired with the residual image read-out operation performed on the erased stimulable phosphor sheet, is multiplied by the residual image decay rate, which has been stored and takes a value in accordance with the elapsed period having been measured. Also, the residual image signal, which has been acquired with the multiplication by the residual image decay rate, is subtracted from the radiation image signal, which represents the radiation image of the object and has been acquired with the radiation image read-out operation performed on the stimulable phosphor sheet having been subjected to the radiation image recording operation for recording the radiation image of the object on the stimulable phosphor sheet having been subjected to the residual image read-out operation, the radiation image signal containing the residual image signal, which represents the residual image having decayed in accordance with the elapsed period. In this manner, the radiation image signal, which represents the radiation image of the object and which is free from the residual image signal representing the residual image having decayed, is acquired. Therefore, with the decay of the residual image on the stimulable phosphor sheet with the passage of time being taken into consideration, the residual image signal, which represents the residual image, is capable of being discriminated from the radiation image signal, which represents the radiation image of the object, and the residual image signal is capable of being removed. Accordingly, the residual image signal is capable of being removed more accurately such that the image quality of the reproduced radiation image of the object may not become bad.

With each of the first radiation image recording and read-out method and system and the second radiation image recording and read-out method and system in accordance with the present invention, wherein the radiation image read-out operation and the residual image read-out operation are performed with the single same read-out means, the cost of the system is capable of being kept low, and the size of the system is capable of being kept small.

Each of the first radiation image recording and read-out method and system and the second radiation image recording and read-out method and system in accordance with the present invention may be modified such that a detection is made as to whether a reservation for a next radiation image recording operation has or has not been made, the erasing operation is performed for a short length of time in cases where it has been detected that the reservation for the next radiation image recording operation has been made, and the erasing operation is performed for a long length of time, which is longer than the short length of time, in cases where it has been detected that the reservation for the next radiation image recording operation has not been made. With the modification described above, the radiation image recording operation is capable of being performed more efficiently.

Also, each of the first radiation image recording and read-out method and system and the second radiation image recording and read-out method and system in accordance with the present invention may be modified such that a detection is made as to whether a reservation for a next radiation image recording operation has or has not been made, the erasing operation is ceased midway in cases where it has been detected during the erasing operation that the reservation for the next radiation image recording operation has been made, and the residual image read-out operation is performed on the stimulable phosphor sheet, for which the erasing operation has been ceased midway. With the modification described above, the radiation image recording operation is capable of being performed more efficiently.

Further, each of the first radiation image recording and read-out method and system and the second radiation image recording and read-out method and system in accordance with the present invention may be modified such that the elapsed period, which has elapsed after the residual image read-out operation was performed on the stimulable phosphor sheet, is measured, the information representing the predetermined update period for the updating of the residual image signal, which represents the residual image, is stored, and a detection is made as to whether a radiation image recording operation has or has not been performed after the residual image read-out operation was performed on the stimulable phosphor sheet. The residual image read-out operation is again performed on the stimulable phosphor sheet when the elapsed period, which has elapsed after the residual image read-out operation was performed on the stimulable phosphor sheet and which has been measured, has become longer than the predetermined update period, which is stored, in cases where it has been detected that the radiation image recording operation has not been performed after the residual image read-out operation was performed on the stimulable phosphor sheet. In this manner, the residual image signal, which represents the residual image, is updated. With the modification described above, the residual image signal is capable of being removed more accurately.

In such cases, each of the first radiation image recording and read-out method and system and the second radiation image recording and read-out method and system in accordance with the present invention may be modified such that the predetermined update period, which is to be stored, is set to be long as the representative value of the residual image signal, which represents the residual image, becomes large. With the modification described above, the radiation image recording operation is capable of being performed more efficiently.

Furthermore, each of the first radiation image recording and read-out method and system and the second radiation image recording and read-out method and system in accordance with the present invention may be modified such that the information representing the erasing demand threshold value, which acts as a criterion for a demand for the erasing operation, is stored, and the erasing operation is performed in cases where the representative value of the residual image signal, which represents the residual image and has been acquired with the residual image read-out operation performed on the stimulable phosphor sheet, is equal to at least the erasing demand threshold value, which is stored. With the modification described above, the radiation image recording operation is capable of being performed more efficiently.

Also, each of the first radiation image recording and read-out method and system and the second radiation image recording and read-out method and system in accordance with the present invention may be modified such that the information representing the residual image threshold value, which acts as a criterion for omission of the operation for removing the residual image signal, is stored, and the operation for removing the residual image signal is omitted in cases where the representative value of the residual image signal, which represents the residual image and has been acquired with the residual image read-out operation performed on the stimulable phosphor sheet, is smaller than the residual image threshold value, which is stored. With the modification described above, the radiation image recording operation is capable of being performed more efficiently.

In such cases, each of the first radiation image recording and read-out method and system and the second radiation image recording and read-out method and system in accordance with the present invention may be modified such that the representative value of the residual image signal, which represents the residual image, maybe the value of the residual image signal component corresponding to the rank, at which the cumulative frequency of occurrence taken from the maximum value side with respect to the total frequency of occurrence of the histogram constituted of the values of the residual image signal components of the residual image signal is equal to the predetermined frequency of occurrence. With the modification described above, the representative value is capable of being set more reliably.

Alternatively, each of the first radiation image recording and read-out method and system and the second radiation image recording and read-out method and system in accordance with the present invention may be modified such that the representative value of the residual image signal, which represents the residual image, may be the maximum value of the processed residual image signal, which is acquired with the running mean processing of the residual image signal for removal of high frequency components. With the modification described above, the representative value is capable of being set more reliably.

Further, each of the first radiation image recording and read-out method and system and the second radiation image recording and read-out method and system in accordance with the present invention may be modified such that the length of time of the erasing operation, and/or the erasing demand threshold value, and/or the residual image threshold value, and/or the update period is altered in accordance with the radiation image recording conditions employed in the next radiation image recording operation. With the modification described above, the radiation image recording operation is capable of being performed more efficiently.

BRIEF DESCRIPTION OF THE DRAWINGS

FIG. 3 is a flow chart showing a second example of a procedure (in cases where a reservation for a next radiation image recording operation has been made), FIGS. 4A and 4B illustrate a flow chart showing a third example of a procedure (in cases where a reservation for a next radiation image recording operation has not been made)

DESCRIPTION OF THE PREFERRED EMBODIMENTS

The present invention will hereinbelow be described in further detail with reference to the accompanying drawings.

Figure 1:
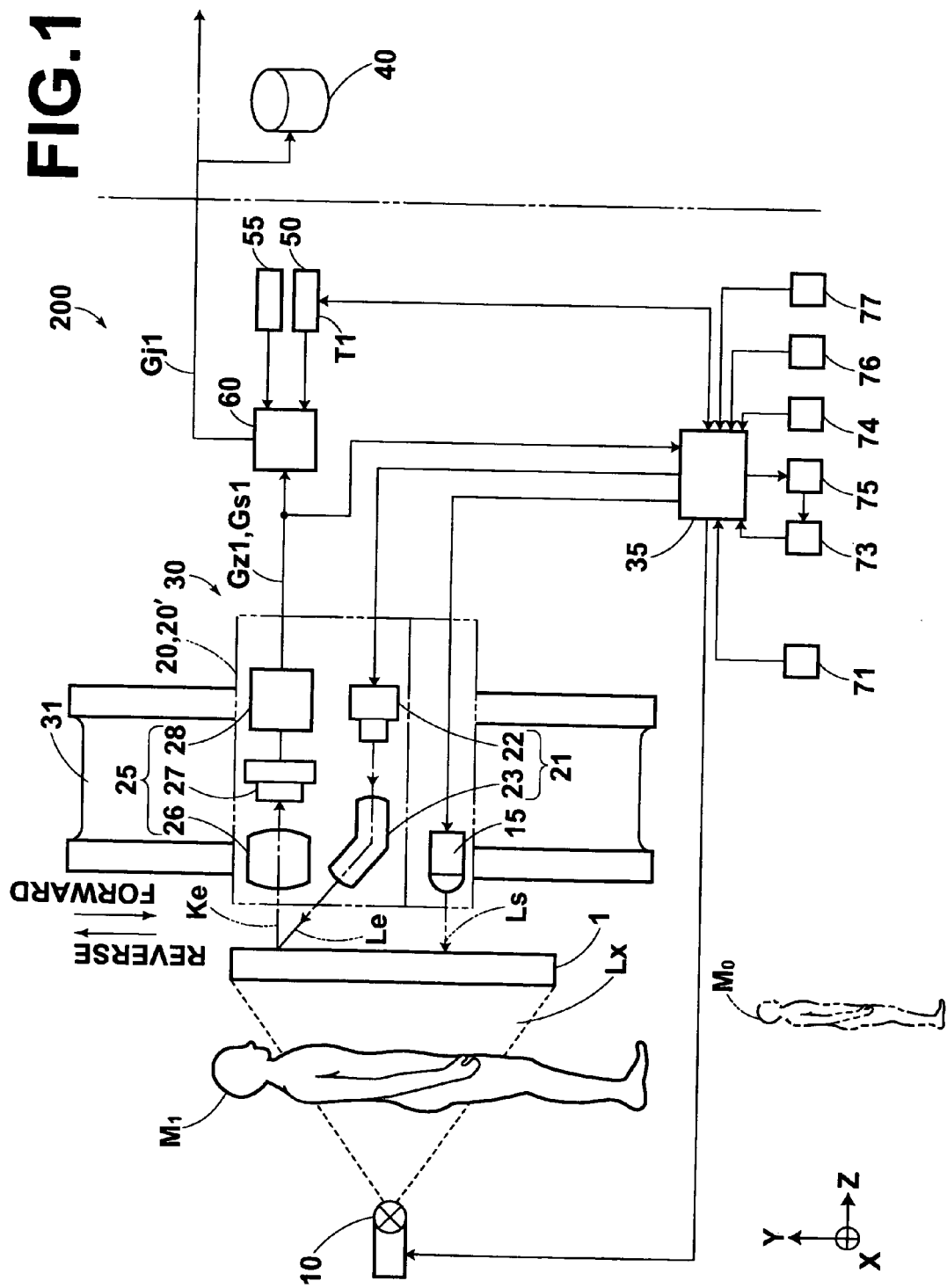
FIG. 1 is a schematic view showing an embodiment of the radiation image recording and read-out system in accordance with the present invention.

FIG. 1 is a schematic view showing an embodiment of the radiation image recording and read-out system in accordance with the present invention.

With reference to FIG. 1, a radiation image recording and read-out system 200, which is an embodiment of the radiation image recording and read-out system in accordance with the present invention, is constituted such that a radiation image recording operation, a radiation image read-out operation, and an erasing operation are performed iterately on an identical stimulable phosphor sheet 1. The radiation image recording and read-out system 200 comprises a radiation image recording section 10 for recording a radiation image of an object M1 on the stimulable phosphor sheet 1. The radiation image recording and read-out system 200 also comprises a radiation image read-out section 20 for reading out the radiation image of the object M1 from the stimulable phosphor sheet 1, on which the radiation image of the object M1 has been recorded, and thereby acquiring a radiation image signal representing the radiation image of the object M1. The radiation image recording and read-out system 200 further comprises an erasing section 15 for performing the erasing operation on the stimulable phosphor sheet 1, from which the radiation image of the object M1 has been read out with the radiation image read-out section 20.

The radiation image recording and read-out system 200 still further comprises a residual image read-out section 20' for performing a residual image read-out operation on the stimulable phosphor sheet 1, which has been subjected to the erasing operation performed by the erasing section 15, and thereby acquiring a residual image signal, which represents a residual image remaining on the stimulable phosphor sheet 1 after the stimulable phosphor sheet 1 has been subjected to the erasing operation. The radiation image recording and read-out system 200 also comprises an elapsed period measuring section 50 for measuring an elapsed period that has elapsed between when the residual image read-out operation was performed by the residual image read-out section 20' and on the stimulable phosphor sheet 1, which had been subjected to the erasing operation, and when the radiation image read-out operation is performed by the radiation image read-out section 20 and on the stimulable phosphor sheet 1, which has been subjected to the radiation image recording operation performed by the radiation image recording section 10 for recording the radiation image of the object M1 on the stimulable phosphor sheet 1 having been subjected to the residual image read-out operation performed by the residual image read-out section 20'. The radiation image recording and read-out system 200 further comprises a decay rate storing section 55 for storing information, which represents a residual image decay rate representing a rate of decay of the residual image on the stimulable phosphor sheet 1. The radiation image recording and read-out system 200 still further comprises a residual image signal removing section 60. The residual image signal removing section 60 receives the residual image signal, which represents the residual image and has been acquired with the residual image read-out section 20', and the radiation image signal, which represents the radiation image of the object M1 and has been acquired with the radiation image read-out operation performed by the radiation image read-out section 20 and on the stimulable phosphor sheet 1 having been subjected to the radiation image recording operation performed by the radiation image recording section 10 for recording the radiation image of the object M1 on the stimulable phosphor sheet 1 having been subjected to the residual image read-out operation performed by the residual image read-out section 20', the radiation image signal containing the residual image signal, which represents the residual image having decayed in accordance with the elapsed period. The residual image signal removing section 60 also multiplies the residual image signal, which has been acquired with the residual image read-out operation performed by the residual image read-out section 20', by the residual image decay rate, which has been stored in the decay rate storing section 55 and takes a value in accordance with the elapsed period having been measured by the elapsed period measuring section 50. The residual image signal removing section 60 further subtracts the residual image signal, which has been acquired with the multiplication by the residual image decay rate, from the radiation image signal, which represents the radiation image of the object M1 and has been acquired with the radiation image read-out operation performed by the radiation image read-out section 20, the radiation image signal containing a residual image signal, which represents the residual image having decayed in accordance with the elapsed period, in order to acquire a residual image-free radiation image signal, which represents the radiation image of the object M1 and which is free from the residual image signal representing the residual image having decayed.

In this embodiment, the radiation image read-out section 20 acts also as the residual image read-out section 20'. The residual image occurs due to radiation energy remaining on the stimulable phosphor sheet 1 even further after the erasing operation has been performed with the erasing section 15 and on the stimulable phosphor sheet 1, which has been subjected to the radiation image read-out operation.

The radiation image recording section 10 is constituted of a control section, which controls a radiation dose, and a radiation source, which produces the radiation by being controlled by the control section.

The radiation image read-out section 20, which acts also as the residual image read-out section 20', comprises a stimulating ray irradiating section 21 for irradiating stimulating rays Le to the stimulable phosphor sheet 1, on which the radiation image of the object M1 has been stored. The stimulating rays Le cause the stimulable phosphor sheet 1 to emit light Ke in proportion to the amount of energy stored on the stimulable phosphor sheet 1 during the exposure of the stimulable phosphor sheet 1 to the radiation. The radiation image read-out section 20 also comprises an emitted light receiving and reading section 25 for detecting the light Ke, which is emitted by the stimulable phosphor sheet 1 when the stimulable phosphor sheet 1 is exposed to the stimulating rays Le, and outputting the radiation image signal representing the radiation image of the object M1.

The stimulating ray irradiating section 21 comprises a laser beam source 22 for radiating out a laser beam, which acts as the stimulating rays Le. The stimulating ray irradiating section 21 also comprises an optical system 23 for irradiating the stimulating rays Le, which have been radiated out from the laser beam source 22, onto a linear region of the stimulable phosphor sheet 11, which linear region extends along a main scanning direction (indicated by the arrow X in FIG. 1).

The emitted light receiving and reading section 25 comprises an optical system 26 for collecting the light Ke, which has been emitted by the linear region of the stimulable phosphor sheet 1, onto a linear region of a light receiving section 27, which will be described below. The emitted light receiving and reading section 25 also comprises the light receiving section 27 for receiving the emitted light Ke, which has been collected by the optical system 26, and performing photoelectric conversion of the emitted light Ke. The light receiving section 27 is constituted of a line sensor extending along the main scanning direction described above. The emitted light receiving and reading section 25 further comprises an analog-to-digital converter 28 for converting an analog image signal, which has been obtained from the photoelectric conversion of the emitted light Ke performed by the light receiving section 27, into a digital image signal and outputting the thus obtained image signal. The light receiving section 27 is constituted of a plurality of line CCD's connected with one another.

The radiation image read-out section 20 and the erasing section 15 are reciprocally moved (up and down in the cases of FIG. 1) by a vertical movement actuating section 31 of the radiation image recording and read-out system 200. Specifically, the radiation image read-out section 20 and the erasing section 15 are reciprocally moved in a sub-scanning direction (indicated by the arrow Y in FIG. 1), which is normal to the main scanning direction, and along the surface of the stimulable phosphor sheet 1. Through the reciprocal movements of the radiation image read-out section 20 and the erasing section 15, the image read-out operation and the erasing operation are performed. In this embodiment, the radiation image read-out section 20 and the erasing section 15 are combined into an integral body and constituted as a read-out and erasing unit 30. Alternatively, the vertical movement actuating section 31 may be constituted such that the reciprocal movement of the radiation image read-out section 20 in the sub-scanning direction and the reciprocal movement of the erasing section 15 in the sub-scanning direction are performed as two independent movements.

The radiation image recording and read-out system 200 still further comprises a controller 35, which acts as the control means for performing control of the information and the operations of the entire system.

The radiation image recording and read-out system 200 also comprises a reservation detecting section 71 for making a detection as to whether a reservation for a next radiation image recording operation has or has not been made. The radiation image recording and read-out system 200 further comprises an update period storing section 73 for storing the information representing a predetermined update period for the updating of the residual image signal, which represents the residual image. The radiation image recording and read-out system 200 still further comprises an image recording operation detecting section 74 for making a detection as to whether a radiation image recording operation has or has not been performed by the radiation image recording section 10 after the residual image read-out operation was performed by the residual image read-out section 20' and on the stimulable phosphor sheet 1. The radiation image recording and read-out system 200 also comprises an update period setting section 75 for setting the predetermined update period, which is to be stored in the update period storing section 73. The radiation image recording and read-out system 200 further comprises an erasing demand threshold value storing section 76 for storing the information representing an erasing demand threshold value, which is a predetermined value acting as a criterion for a demand for the erasing operation performed by the erasing section 15. The radiation image recording and read-out system 200 still further comprises a residual image threshold value storing section 77 for storing the information representing a residual image threshold value, which is a predetermined value acting as a criterion for omission of the operation of the residual image signal removing section 60 for removing the residual image signal. The reservation detecting section 71, the update period storing section 73, the image recording operation detecting section 74, the update period setting section 75, the erasing demand threshold value storing section 76, and the residual image threshold value storing section 77 are connected to the controller 35, and input and output operations for various pieces of information are performed between the sections described above and the controller 35.

The update period setting section 75 sets the update period to be long as a representative value of the residual image signal, which represents the residual image and has been acquired with the residual image read-out section 20', becomes large. The elapsed period measuring section 50 also acts as a period measuring section for measuring an elapsed period, which has elapsed after the residual image read-out operation was performed by the residual image read-out section 20' and on the stimulable phosphor sheet 1.

The controller 35 also performs the control operations described below.

Control operation 1: A control operation for controlling such that:

the erasing section 15 performs the erasing operation for a short length of time in cases where it has been detected by the reservation detecting section 71 that the reservation for the next radiation image recording operation has been made, and the erasing section 15 performs the erasing operation for a long length of time, which is longer than the short length of time, in cases where it has been detected by the reservation detecting section 71 that the reservation for the next radiation image recording operation has not been made, the operation of the residual image signal removing section 60 for removing the residual image signal being thus omitted.

Control operation 2: A control operation for controlling such that:

the erasing operation is ceased midway in cases where it has been detected by the reservation detecting section 71 during the erasing operation, which is being performed by the erasing section 15, that the reservation for the next radiation image recording operation has been made, and the residual image read-out section 20' performs the residual image read-out operation on the stimulable phosphor sheet 1, for which the erasing operation has been ceased midway.

Control operation 3: A control operation for controlling such that:

the residual image read-out section 20' again performs the residual image read-out operation on the stimulable phosphor sheet 1 when the elapsed period, which has elapsed after the residual image read-out operation was performed on the stimulable phosphor sheet 1 and which has been measured by the elapsed period measuring section 50, has become longer than the predetermined update period, which is stored in the update period storing section 73, in cases where it has been detected by the image recording operation detecting section 74 that the radiation image recording operation has not been performed after the residual image read-out operation was performed on the stimulable phosphor sheet 1, the residual image signal, which represents the residual image, being thereby updated.

(The update period stored in the update period storing section 73 has been set by the update period setting section 75.)

Control operation 4: A control operation for controlling such that:

the erasing section 15 performs the erasing operation in cases where a representative value of the residual image signal, which represents the residual image and has been acquired with the residual image read-out operation performed by the residual image read-out section 20' and on the stimulable phosphor sheet 1, is equal to at least the erasing demand threshold value, which is the predetermined value stored in the erasing demand threshold value storing section 76.

Control operation 5: A control operation for controlling such that:

the operation of the residual image signal removing section 60 for removing the residual image signal is omitted in cases where a representative value of the residual image signal, which represents the residual image and has been acquired with the residual image read-out operation performed by the residual image read-out section 20' and on the stimulable phosphor sheet 1, is smaller than the residual image threshold value, which is the predetermined value stored in the residual image threshold value storing section 77.

Control operation 6: A control operation for altering the length of time of the erasing operation, and/or the erasing demand threshold value, and/or the residual image threshold value, and/or the update period in accordance with radiation image recording conditions employed in a next radiation image recording operation performed by the radiation image recording section 10.

By way of example, the representative value of the residual image signal, which represents the residual image, may be a value of a residual image signal component corresponding to a rank, at which a cumulative frequency of occurrence taken from a maximum value side with respect to a total frequency of occurrence of a histogram constituted of the values of the residual image signal components of the residual image signal is equal to a predetermined frequency of occurrence. Alternatively, the representative value of the residual image signal, which represents the residual image, may be a maximum value of a processed residual image signal, which is acquired with running mean processing of the residual image signal for removal of high frequency components.

The residual image threshold value is the predetermined value, which acts as the criterion for allowing the use of the stimulable phosphor sheet 1 in the next radiation image recording operation.

Four examples of how the residual image-free radiation image signal, which represents the radiation image of the object M1 and which is free from the residual image signal representing the residual image having decayed, is acquired by use of the radiation image recording and read-out system 200 will hereinbelow be described in detail.

Figure 2:
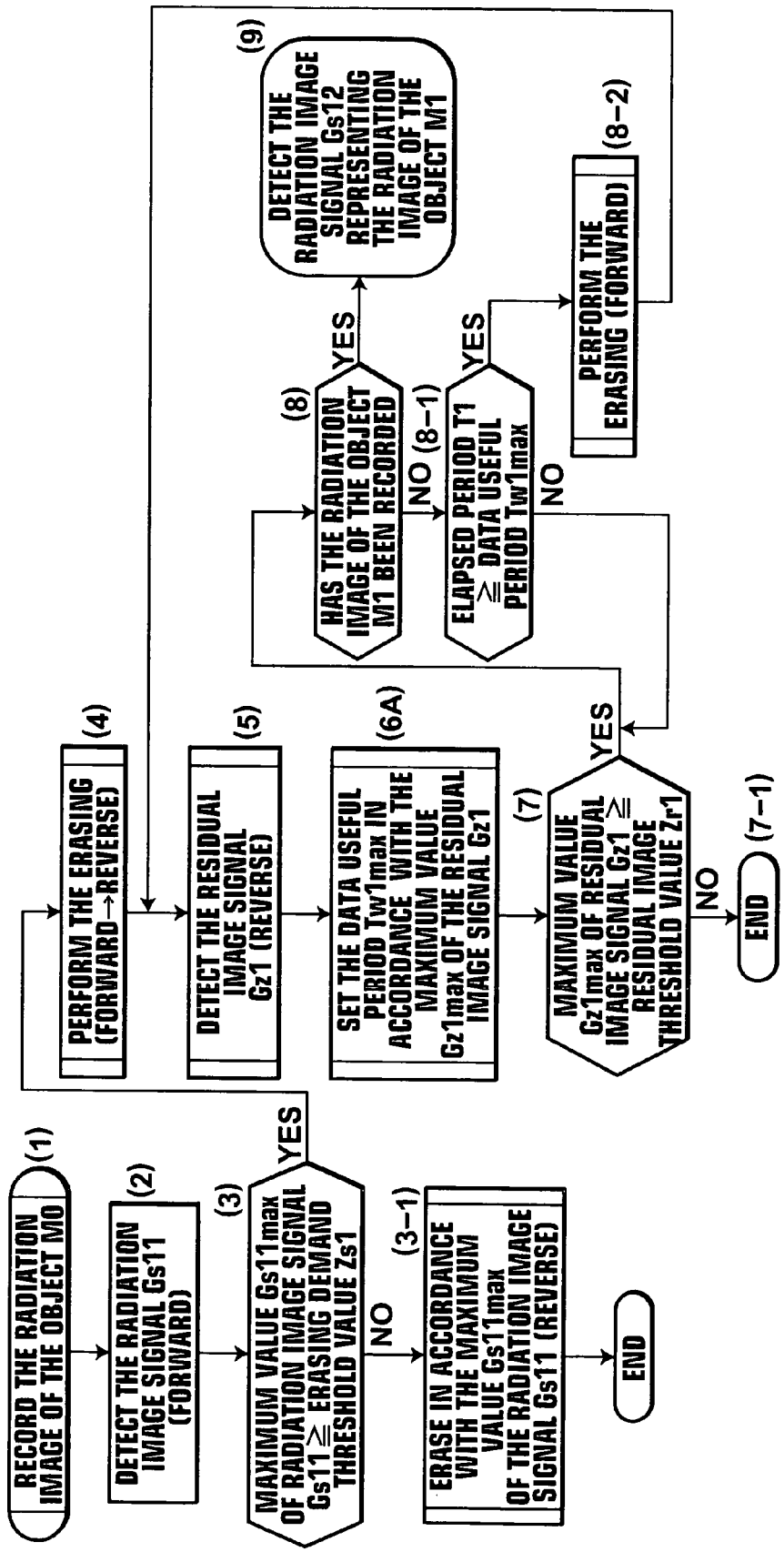
FIG. 2 is a flow chart showing a first example of a procedure (in cases where a reservation for a next radiation image recording operation has been made)

FIG. 2 is a flow chart showing a first example of a procedure (in cases where a reservation for a next radiation image recording operation has been made). The operations illustrated in FIG. 2 are controlled principally by the controller 35.

FIRST EXAMPLE OF A PROCEDURE

In Cases Where a Reservation for a Next Radiation Image Recording Operation Has Been Made Step (1): Radiation Lx, which has been produced by the radiation image recording section 10, is irradiated to an object M0. The radiation Lx, which carries the image information of the object M0, is irradiated to the stimulable phosphor sheet 1, and a radiation image of the object M0 is thereby recorded on the stimulable phosphor sheet 1.

Step (2): The read-out and erasing unit 30 is moved forwardly, and the radiation image read-out section 20 reads out the radiation image of the object M0 from the stimulable phosphor sheet 1. In this manner, a radiation image signal Gs11, which represents the radiation image of the object M0 and contains a residual image signal representing a residual image, is acquired.

Step (3): The controller 35 receives the radiation image signal Gs11 and compares a maximum value Gs11max of the radiation image signal Gs11, which maximum value acts as the representative value of the values of the radiation image signal Gs11, and an erasing demand threshold value Zs1, which is stored previously in the controller 35, with each other. In cases where Gs11max<Zs1, the processing proceeds to a step (3-1). In cases where Gs11max≧Zs1, the processing proceeds to a step (4).

Step (3-1): Since the energy level of radiation energy remaining on the stimulable phosphor sheet 1 is sufficiently low, the read-out and erasing unit 30 is moved reversely, and the erasing section 15 performs the erasing operation for a short length of time on the stimulable phosphor sheet 1, such that erasing energy in accordance with the maximum value Gs11max may be imparted to the stimulable phosphor sheet 1. As a result, the stimulable phosphor sheet 1 becomes usable for the next radiation image recording operation.

Step (4): Since the energy level of radiation energy remaining on the stimulable phosphor sheet 1 is high, it is regarded that the operation for removing the residual image signal should be performed. Therefore, the read-out and erasing unit 30 is moved from the forward path to the reverse path, and the erasing section 15 performs the erasing operation on the stimulable phosphor sheet 1. The energy level of radiation energy remaining on the stimulable phosphor sheet 1 is thus set to be low.

Step (5): The read-out and erasing unit 30 is moved reversely, and the residual image read-out operation is performed on the stimulable phosphor sheet 1. A residual image signal Gz1 is thus acquired. There sidual image signal Gz1 is acquired for use in the operation for removing the residual image signal, which operation is to be performed with respect to the next object M1.

Step (6A): The controller 35 receives the residual image signal Gz1 and sets a data useful period Tw1 max in accordance with a maximum value Gz1max of the residual image signal Gz1, which maximum value acts as the representative value of the values of the residual image signal Gz1.

Step (7): The controller 35 compares the maximum value Gz1max of the residual image signal Gz1 and a residual image threshold value Zr1 with each other. In cases where Gz1max<Zr1, the processing proceeds to a step (7-1). In cases where Gz1max≧Zr1, the processing proceeds to a step (8).

Step (7-1): Since the energy level of radiation energy remaining on the stimulable phosphor sheet 1 is sufficiently low, the operation for removing the residual image signal need not be performed, and the stimulable phosphor sheet 1 is capable of being used for the next radiation image recording operation performed on the next object M1.

Step (8): The controller 35 makes a judgment as to whether the radiation image recording operation has or has not been performed on the next object M1. In cases where it has been judged that the radiation image recording operation has been performed on the next object M1, the processing proceeds to a step (9). In cases where it has been judged that the radiation image recording operation has not been performed on the next object M1, the processing proceeds to a step (8-1).

Step (8-1): The controller 35 makes a judgment as to whether an elapsed period T1, which has been measured by the elapsed period measuring section 50, is or is not longer than the data useful period Tw1max. In cases where it has been judged that the elapsed period T1 is not longer than the data useful period Tw1max, the processing returns to the step (8). In cases where it has been judged that the elapsed period T1 is longer than the data useful period Tw1max, the processing proceeds to a step (8-2).

Step (8-2): Since a long period of time has elapsed, the accurate operation for removing the residual image signal by use of the residual image signal Gz1 having been acquired is not capable of being performed. Therefore, the read-out and erasing unit 30 is moved forwardly, and the erasing section 15 performs the erasing operation on the stimulable phosphor sheet 1. The energy level of radiation energy remaining on the stimulable phosphor sheet 1 is thus set to be low. The processing then returns to the step (5).

Step (9): After the next radiation image recording operation has been performed by the radiation image recording section 10 and on the next object M1, the radiation image of the object M1, which radiation image has been recorded on the stimulable phosphor sheet 1, is read out, and a radiation image signal Gs12 is thereby acquired.

Also, the residual image signal removing section 60 receives the radiation image signal Gs12, which has been acquired in the step (9), the residual image signal Gz1, which has been acquired in the step (5), the information representing the elapsed period T1, which has been measured by the elapsed period measuring section 50, and the information representing the residual image decay rate in accordance with the elapsed period T1, which information has been stored in the decay rate storing section 55. In accordance with the received pieces of information, the residual image signal removing section 60 acquires a residual image-free radiation image signal Gj1, which represents the radiation image of the object M1 and which is free from the residual image signal representing the residual image having decayed in accordance with the elapsed period.

Specifically, the residual image signal removing section 60 multiplies the residual image signal Gz1, which has been acquired with the residual image read-out operation performed by the radiation image read-out section 20 and which represents the residual image before decaying, by the residual image decay rate having been stored in the decay rate storing section 55 (i.e., the residual image decay rate, which takes a value in accordance with the elapsed period T1 having been measured by the elapsed period measuring section 50). From the multiplication by the residual image decay rate, a decayed residual image signal is acquired. Also, the residual image signal removing section 60 subtracts the decayed residual image signal, which has been acquired with the multiplication by the residual image decay rate, from the radiation image signal Gs12, which represents the radiation image of the object M1 and has been acquired with the radiation image read-out operation performed by the radiation image read-out section 20, the radiation image signal Gs12 containing the residual image signal, which represents the residual image having decayed in accordance with the elapsed period. In this manner, the residual image signal removing section 60 acquires the residual image-free radiation image signal Gj1, which represents the radiation image of the object M1 and which is free from the residual image signal representing the residual image having decayed in accordance with the elapsed period.

The thus acquired residual image-free radiation image signal Gj1, which represents the radiation image of the object M1, is transmitted to a data base storing section 40, an external image processing unit, or the like. The residual image-free radiation image signal Gj1 is thus subjected to image processing or is stored.

Examples of algorithms for the operation for removing the residual image signal will be described hereinbelow.

<Algorithms 1 for the Operation for Removing the Residual Image Signal>

In Cases Where the Residual Image Decay Rate is Set for Each of Line CCD's

1. Formation of Residual Image Signal

1) The residual image is read out by the radiation image read-out section 20 (as in the step (5) illustrated in FIG. 2). A series of compensation processings, such as shading compensation, are performed.

2) When necessary, the processings described below for noise removal, abnormal data removal, and reduction of the storage capacity are performed.

Thinning-out processing for thinning out the residual image signal in units of pixel signal components, which represent several pixels, and thereby reducing the image size Image size reduction processing, in which a mean value of the values of several pixel signal components is taken as one new pixel signal component Medial filtering processing The processings described above are combined with one another, and the image size is reduced to, for example, ⅛.

3) The maximum value of the values of the residual image signal, which maximum value acts as the representative value of the residual image signal, is calculated, and the data useful period Tw1max is set in accordance with the maximum value of the values of the residual image signal. The maximum value of the values of the residual image signal should preferably be calculated after the running mean processing for removal of the high frequency components has been performed on the residual image signal. In cases where the maximum value is smaller than the residual image threshold value, it is regarded that the residual image signal is not contained in the radiation image signal, and the operation for removing the residual image signal is not performed. In cases where the image size is to be reduced, the residual image read-out operation may be performed with respect to a pixel size larger than the pixel size employed in the ordinary radiation image read-out operation. (For example, a set of two pixels×two pixels may be read out collectively as one pixel.) In such cases, the read-out time and the processing time are capable of being kept short.

Operation for Removing the Residual Image Signal

1) The information representing the elapsed period T1, which has been measured by the elapsed period measuring section 50, is acquired (as in the step (8-1) illustrated in FIG. 2). The elapsed period T1 is the elapsed period that has elapsed between when the residual image read-out operation was performed by the radiation image read-out section 20 and on the stimulable phosphor sheet 1, which had been subjected to the erasing operation, and when the radiation image read-out operation is performed by the radiation image read-out section 20 and on the stimulable phosphor sheet 1, which has been subjected to the radiation image recording operation performed by the radiation image recording section 10 for recording the radiation image of the object M1 on the stimulable phosphor sheet 1 having been subjected to the residual image read-out operation performed by the radiation image read-out section 20.

2) The residual image decay rate, which takes the value in accordance with the elapsed period T1 (in units of one second) with the apparent residual image decay due to differences in detection sensitivity for the residual image read-out operation among the CCD's (differences in erasing characteristics) being taken into consideration, is acquired from a look-up table having been stored in the decay rate storing section 55.

3) The residual image signal is multiplied by the residual image decay rate, which is set for each CCD (and which takes the value acquired from the look-up table having been stored in the decay rate storing section 55).

4) The residual image signal, which has been acquired with the multiplication by the residual image decay rate, is subjected to processing, such as linear interpolation, for returning the image size to the same image size as that of the residual image represented by the original residual image signal. The residual image signal obtained from the processing described above is then subtracted from the radiation image signal described above, and the residual image-free radiation image signal is thereby acquired.

3. Measurement of the Residual Image Decay Rate (The measurement of the residual image decay rate is performed at the time of delivery of the system, routine maintenance, change-over of the line scanner, change-over of the stimulable phosphor sheet, or the like.)

1) The radiation of approximately 500 mR is irradiated to the stimulable phosphor sheet 1. Also, as a first residual image read-out operation for acquiring a first residual image signal, the residual image read-out operation is performed on the stimulable phosphor sheet 1 in the same manner as in the step (5) of the aforesaid first example of the procedure (in cases where a reservation for a next radiation image recording operation has been made). When an elapsed period of 20 seconds has elapsed after the first residual image read-out operation was performed, without the radiation irradiating operation being performed on the stimulable phosphor sheet 1, a second residual image read-out operation for acquiring a second residual image signal is performed on the stimulable phosphor sheet 1.

2) In each of the first residual image read-out operation and the second residual image read-out operation, the processing is performed in the same manner as that described above under the title of "1. Formation of residual image signal."

3) With respect to each region, which is read out with one CCD, a mean value of the values of the ratio represented by the formula {(second residual image signal)/(first residual image signal)} is calculated. The thus calculated mean value is taken as the residual image decay rate for each of the CCD's.

4) In the same manner as that described above, the residual image decay rate is calculated with respect to an elapsed time of 60 seconds or a longer elapsed time.

5) An extrapolation formula is acquired from the residual image decay rate with respect to the elapsed time of 20 seconds and the residual image decay rate with respect to the elapsed time of 60 seconds. Also, by use of the extrapolation formula, the look-up table, which represents the values of the residual image decay rate for each CCD and with respect to the elapsed time of up to 180 seconds or a longer elapsed time, is formed.

6) After the residual image decay rate has been calculated in the manner described above, for perfect erasing of the stimulable phosphor sheet 1, the energy level of erasing energy, which is to be imparted to the stimulable phosphor sheet 1, is calculated from the maximum value fo the residual image signal, which maximum value acts as the representative value of the residual image signal, in the same manner as that described above under the title of "1. Formation of residual image signal," and the erasing operation is performed on the stimulable phosphor sheet 1. After the erasing operation has been performed on the stimulable phosphor sheet 1, the residual image read-out operation is performed on the stimulable phosphor sheet 1, and a judgment is made as to whether the maximum value of the thus acquired residual image signal is or is not smaller than the residual image threshold value. In cases where it has been judged that the maximum value of the thus acquired residual image signal is not smaller than the residual image threshold value, the erasing operation is again performed on the stimulable phosphor sheet 1.

<Algorithms 2 for the Operation for Removing the Residual Image Signal>

In Cases Where the Residual Image Decay Rate is Set for Each of Divided Regions Extending in Main Scanning and Sub-scanning Directions 1. Formation of Residual Image Signal 1) The residual image is read out by the radiation image read-out section 20 (as in the step (5) illustrated in FIG. 2). A series of compensation processings, such as shading compensation, are performed.

2) When necessary, the processings described below for noise removal, abnormal data removal, and reduction of the storage capacity are performed.

Thinning-out processing for thinning out the residual image signal in units of pixel signal components, which represent several pixels, and thereby reducing the image size Image size reduction processing, in which a mean value of the values of several pixel signal components is taken as one new pixel signal component Medial filtering processing The processings described above are combined with one another, and the image size is reduced to, for example, ⅛.

3) The maximum value of the values of the residual image signal, which maximum value acts as the representative value of the residual image signal, is calculated, and the data useful period Tw1max is set in accordance with the maximum value of the values of the residual image signal. The maximum value of the values of the residual image signal should preferably be calculated after the running mean processing for removal of the high frequency components has been performed on the residual image signal. In cases where the maximum value is smaller than the residual image threshold value, it is regarded that the residual image signal is not contained in the radiation image signal, and the operation for removing the residual image signal is not performed. In cases where the image size is to be reduced, the residual image read-out operation may be performed with respect to a pixel size larger than the pixel size employed in the ordinary radiation image read-out operation. (For example, a set of two pixels×two pixels may be read out collectively as one pixel.) In such cases, the read-out time and the processing time are capable of being kept short.

Operation for Removing the Residual Image Signal

1) The area of the stimulable phosphor sheet 1 is divided into a plurality of regions, each of which is composed of an appropriate number of pixels taken in main scanning and sub-scanning directions. Also, the values of the residual image decay rate for each of the regions are set with respect to the elapsed period of up to 180 seconds and at intervals of 10 seconds.

2) The information representing the elapsed period T1, which has been measured by the elapsed period measuring section 50, is acquired (as in the step (8-1) illustrated in FIG. 2). The elapsed period T1 is the elapsed period that has elapsed between when the residual image read-out operation was performed by the radiation image read-out section 20 and on the stimulable phosphor sheet 1, which had been subjected to the erasing operation, and when the radiation image read-out operation is performed by the radiation image read-out section 20 and on the stimulable phosphor sheet 1, which has been subjected to the radiation image recording operation performed by the radiation image recording section 10 for recording the radiation image of the object M1 on the stimulable phosphor sheet 1 having been subjected to the residual image read-out operation performed by the radiation image read-out section 20.

3) The value of the residual image decay rate for each region, which residual image decay rate takes the value in accordance with the elapsed period T1, is acquired from the look-up table having been stored in the decay rate storing section 55.

4) The residual image decay rate of each residual image signal is calculated with the linear interpolation, or the like, and from the value of the residual image decay rate for each region. Also, each residual image signal is multiplied by the residual image decay rate.

5) The residual image signal, which has been acquired with the multiplication by the residual image decay rate, is subjected to the processing, such as the linear interpolation, for returning the image size to the same image size as that of the residual image represented by the original residual image signal. The residual image signal obtained from the processing described above is then subtracted from the radiation image signal having been subjected to the shading compensation, and the residual image-free radiation image signal is thereby acquired.

3. Measurement of the Residual Image Decay Rate (The measurement of the residual image decay rate is performed at the time of delivery of the system, routine maintenance, change-over of the line scanner, change-over of the stimulable phosphor sheet, or the like.)

1) The radiation of approximately 500 mR is irradiated to the stimulable phosphor sheet 1. Also, as a first residual image read-out operation for acquiring a first residual image signal, the residual image read-out operation is performed on the stimulable phosphor sheet 1 in the same manner as in the step (5) of the aforesaid first example of the procedure (in cases where a reservation for a next radiation image recording operation has been made). When an elapsed period of 20 seconds has elapsed after the first residual image read-out operation was performed, without the radiation irradiating operation being performed on the stimulable phosphor sheet 1, a second residual image read-out operation for acquiring a second residual image signal is performed on the stimulable phosphor sheet 1.

2) In each of the first residual image read-out operation and the second residual image read-out operation, the processing is performed in the same manner as that described above under the title of "1. Formation of residual image signal."

3) With respect to each of the divided regions, a mean value of the values of the ratio represented by the formula {(second residual image signal)/(first residual image signal)} is calculated. The thus calculated mean value is taken as the residual image decay rate with respect to each of the divided regions.

4) In the same manner as that described above, the residual image decay rate is calculated with respect to an elapsed time of 60 seconds or a longer elapsed time.

5) A linear extrapolation formula is acquired from the residual image decay rate with respect to the elapsed time of 20 seconds and the residual image decay rate with respect to the elapsed time of 60 seconds. Also, by use of the extrapolation formula, the look-up table, which represents the values of the residual image decay rate for each region and with respect to the elapsed time of up to 180 seconds or a longer elapsed time, is formed.

6) After the residual image decay rate has been calculated in the manner described above, for perfect erasing of the stimulable phosphor sheet 1, the energy level of erasing energy, which is to be imparted to the stimulable phosphor sheet 1, is calculated from the maximum value fo the residual image signal, which maximum value acts as the representative value of the residual image signal, in the same manner as that described above under the title of "1. Formation of residual image signal," and the erasing operation is performed on the stimulable phosphor sheet 1. After the erasing operation has been performed on the stimulable phosphor sheet 1, the residual image read-out operation is performed on the stimulable phosphor sheet 1, and a judgment is made as to whether the maximum value of the thus acquired residual image signal is or is not smaller than the residual image threshold value. In cases where it has been judged that the maximum value of the thus acquired residual image signal is not smaller than the residual image threshold value, the erasing operation is again performed on the stimulable phosphor sheet 1.

A second example of a procedure for acquiring a residual image-free radiation image signal Gj2, which represents the radiation image of the object M1 and which is free from the residual image signal representing the residual image having decayed, by use of the radiation image recording and read-out system 200 will hereinbelow be described in detail.

FIG. 3 is a flow chart showing a second example of a procedure (in cases where a reservation for a next radiation image recording operation has been made). As in the first example of the procedure described above, the operations illustrated in FIG. 3 are controlled principally by the controller 35.

SECOND EXAMPLE OF A PROCEDURE

In Cases Where a Reservation for a Next Radiation Image Recording Operation Has Been Made The step (1) to the step (5) are basically identical with the step (1) to the step (5) of the first example of the procedure described above, except that a radiation image signal Gs21 is acquired in the step (2), an erasing demand threshold value Zs2 is set in the step (3), and a residual image signal Gz2 is acquired in the step (5).

Step (6B): The controller 35 receives the residual image signal Gz2. Also, the controller 35 compares a maximum value Gz2max of the residual image signal Gz2, which maximum value acts as the representative value of the values of the residual image signal Gz2, and a residual image erasing demand threshold value Zg2, which has been stored previously in the controller 35, with each other. In cases where Gz2max<Zg2, the processing proceeds to the step (7). In cases where Gz2max≧Zg2, the processing proceeds to a step (6B-1).

Step (6B-1): Since the energy level of radiation energy, which represents the residual image remaining on the stimulable phosphor sheet 1 is high, the erasing time of the erasing operation to be performed by the erasing section 15 is set such that a predetermined level of erasing energy in accordance with the maximum value Gz2max described above, which erasing energy is capable of causing the radiation energy to decay sufficiently, may be imparted to the stimulable phosphor sheet 1.

Step (6B-2): The read-out and erasing unit 30 is moved forwardly in accordance with the erasing time having been set, and the erasing section 15 imparts the predetermined level of erasing energy to the stimulable phosphor sheet 1. Thereafter, the processing returns to the step (5).

Thereafter, the step (7), the step (7-1), the step (8), the step (8-1), the step (8-2), and the step (9) are performed basically in the same manner as those in the first example of the procedure described above.

After the step (9) has been performed, the residual image signal removing section 60 receives a radiation image signal Gs22, which has been acquired in the step (9), the residual image signal Gz2, which has been acquired in the step (5), the information representing an elapsed period T2, which has been measured by the elapsed period measuring section 50, and the information representing the residual image decay rate in accordance with the elapsed period T2, which information has been stored in the decay rate storing section 55. In accordance with the received pieces of information, the residual image signal removing section 60 acquires the residual image-free radiation image signal Gj2, which represents the radiation image of the object M1 and which is free from the residual image signal representing the residual image having decayed in accordance with the elapsed period.

The first example of the procedure and the second example of the procedure described above may be combined with each other such that, in cases where the maximum value of the residual image signal, which maximum value acts as the representative value of the residual image signal, becomes smaller than the residual image erasing demand threshold value, data useful period is set, and the operation for removing the residual image signal is performed.

A third example of a procedure for acquiring a residual image-free radiation image signal Gj3, which represents the radiation image of the object M1 and which is free from the residual image signal representing the residual image having decayed, by use of the radiation image recording and read-out system 200 will hereinbelow be described in detail.

FIGS. 4A and 4B illustrate a flow chart showing a third example of a procedure (in cases where a reservation for a next radiation image recording operation has not been made). As in the first example of the procedure described above, the operations illustrated in FIGS. 4A and 4B are controlled principally by the controller 35.

THIRD EXAMPLE OF A PROCEDURE

In Cases Where a Reservation for a Next Radiation Image Recording Operation Has Not Been Made The step (1), the step (2), the step (3), and the step (3-1) are basically identical with the step (1), the step (2), the step (3), and the step (3-1) of the first example of the procedure described above, except that a radiation image signal Gs31 is acquired in the step (2), and an erasing demand threshold value Zs3 is set in the step (3). In the third example of the procedure, on the assumption that the erasing operation is performed on the stimulable phosphor sheet 1 such that the stimulable phosphor sheet 1 becomes usable for the next radiation image recording operation without the operation for removing the residual image signal being performed, the operation for erasing radiation energy remaining on the stimulable phosphor sheet 1 is performed until an interruption is made for a reservation for the next radiation image recording operation.

Step (4A): An erasing level is detected through a read-out operation, in which, for example, the optical intensity of the stimulating rays is set to be low such that saturation may not be reached in the outputs of the CCD's. Also, in accordance with the detected erasing level, the quantity of erasing energy to be imparted by the read-out and erasing unit 30 to the stimulable phosphor sheet 1 is set.

Step (4A-1): In accordance with the quantity of erasing energy having been set in the step (4A), the read-out and erasing unit 30 is moved reversely, and the erasing operation is begun.

Step (4A-2): The controller 35 makes a judgment as to whether an interruption has or has not been made for the reservation for the next radiation image recording operation. In cases where it has been judged that the interruption has been made for the reservation for the next radiation image recording operation, the processing proceeds to a step (4A-3). In cases where it has been judged that the interruption has not been made for the reservation for the next radiation image recording operation, the processing proceeds to a step (4B).

Step (4B): A judgment is made as to whether the predetermined erasing time for the completion of the erasing operation, which has been begun in the step (4A-1), has or has not elapsed. In cases where it has been judged that the predetermined erasing time has not elapsed, the processing returns to the step (4A-1). In cases where it has been judged that the predetermined erasing time has elapsed, the processing proceeds to a step (4B-1).

Step (4B-1): The read-out and erasing unit 30 is moved reversely, and the residual image read-out operation is performed on the stimulable phosphor sheet 1. A residual image signal Gz3' is thus acquired. The residual image signal Gz3' is not used in the operation for removing the residual image signal.

Step (4B-2): A judgment is made as to whether a maximum value Gz3' max of the residual image signal Gz3', which maximum value acts as the representative value of the values of the residual image signal Gz3', is or is not smaller than a residual image threshold value Zr3. In cases where it has been judged that the maximum value Gz3' max of the residual image signal Gz3' is smaller than the residual image threshold value Zr3, since the energy level of radiation energy remaining on the stimulable phosphor sheet 1 is sufficiently low, the operation for removing the residual image signal need not be performed, and the stimulable phosphor sheet 1 is capable of being used for the next radiation image recording operation.

Step (4B-3): The erasing time for the erasing operation is set in accordance with the maximum value Gz3' max of the residual image signal Gz3'. Thereafter, the processing returns to the step (4A-1).

Step (4A-3): The movement of the read-out and erasing unit 30 is finished with the forward movement.

Thereafter, the step (5), the step (6A), the step (7), the step (7-1), the step (8), the step (8-1), the step (8-2), and the step (9) are performed basically in the same manner as those in the first example of the procedure described above.

After the step (9) has been performed, the residual image signal removing section 60 receives a radiation image signal Gs32, which has been acquired in the step (9), a residual image signal Gz3, which has been acquired in the step (5), the information representing an elapsed period T3, which has been measured by the elapsed period measuring section 50, and the information representing the residual image decay rate in accordance with the elapsed period T3, which information has been stored in the decay rate storing section 55. In accordance with the received pieces of information, the residual image signal removing section 60 acquires the residual image-free radiation image signal Gj3, which represents the radiation image of the object M1 and which is free from the residual image signal representing the residual image having decayed in accordance with the elapsed period.

A fourth example of a procedure for acquiring a residual image-free radiation image signal Gj4, which represents the radiation image of the object M1 and which is free from the residual image signal representing the residual image having decayed, by use of the radiation image recording and read-out system 200 will hereinbelow be described in detail.

Figure 5A:
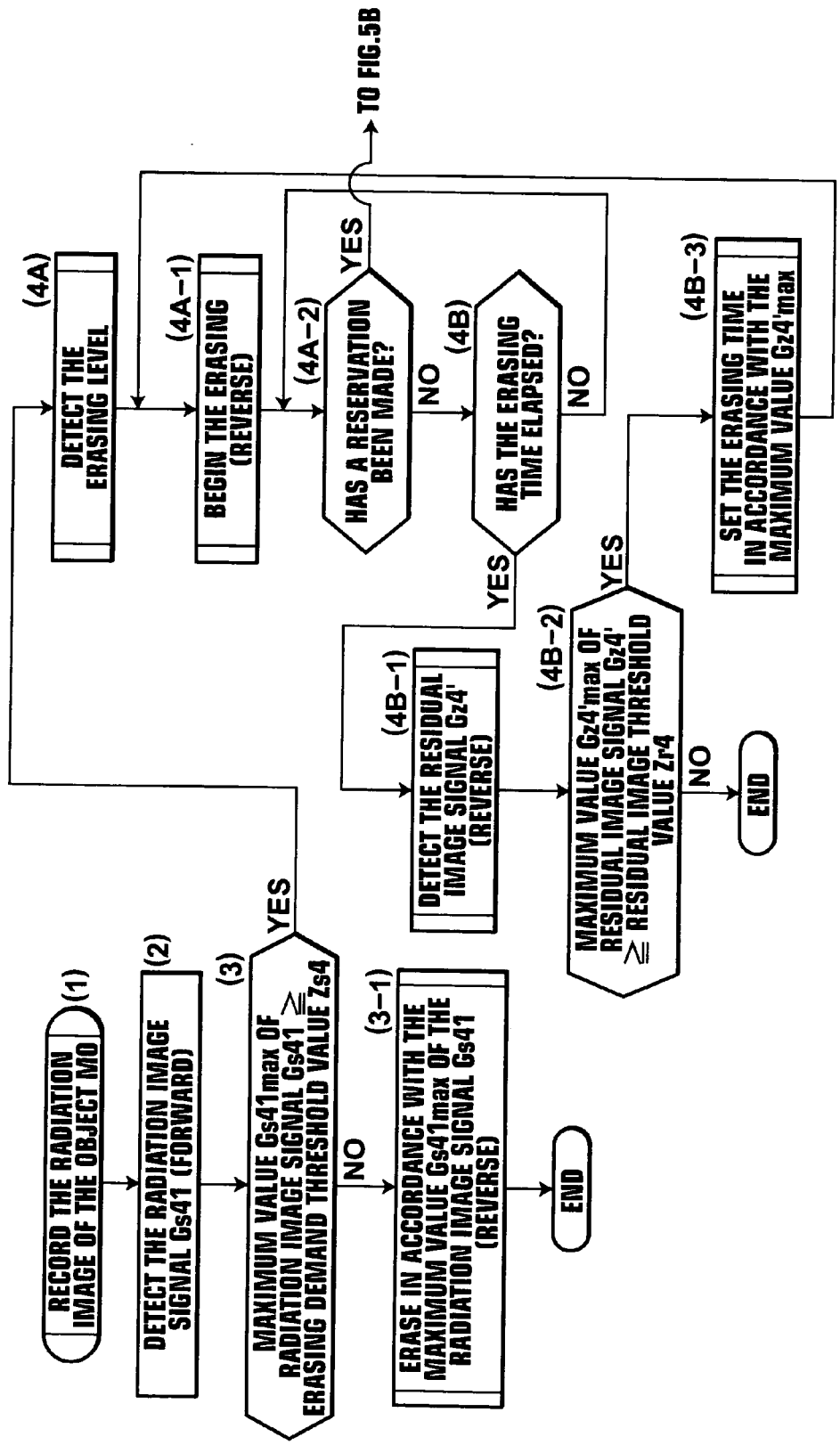
FIGS. 5A and 5B illustrate a flow chart showing a fourth example of a procedure (in cases where a reservation for a next radiation image recording operation has not been made)
Figure 5B:
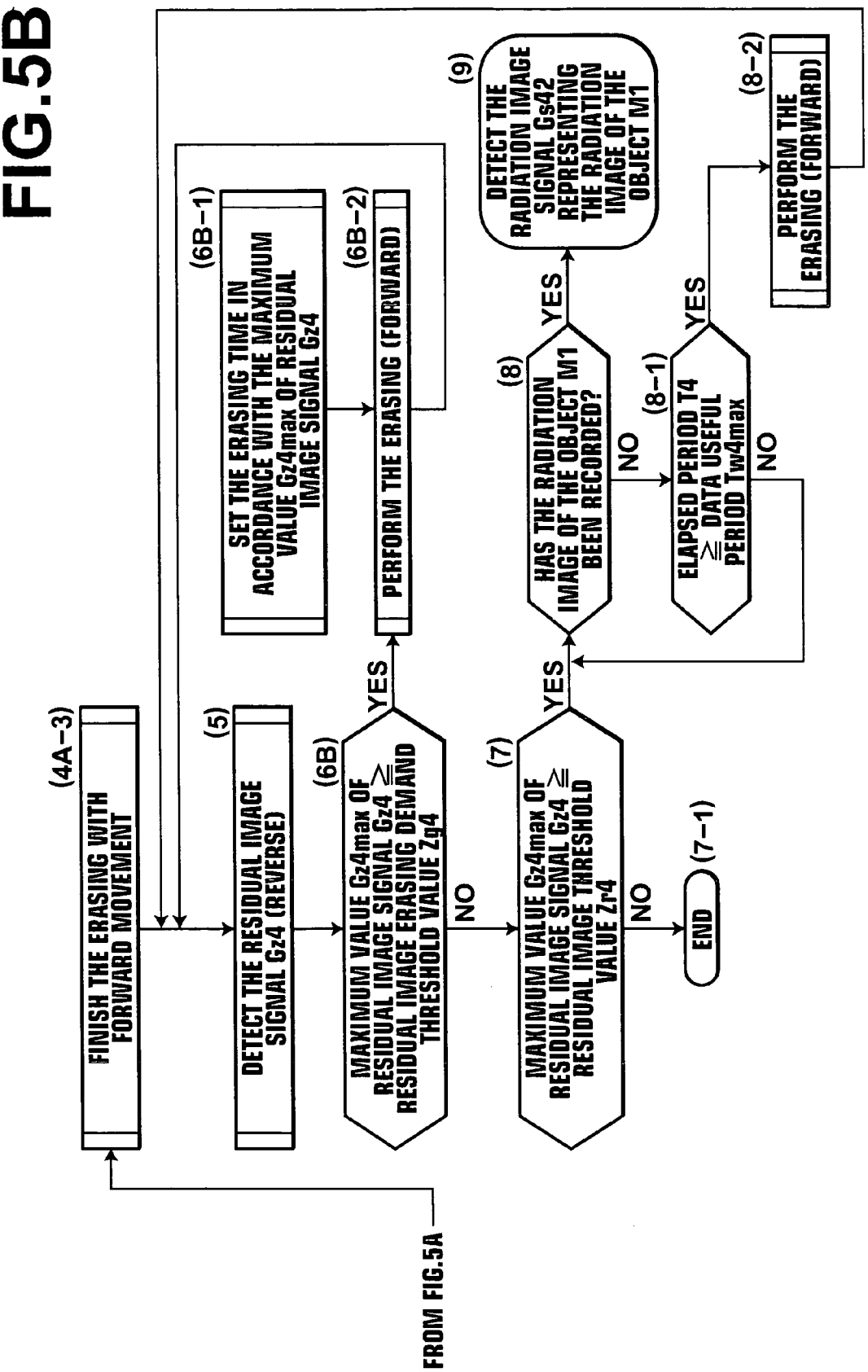

FIGS. 5A and 5B illustrate a flow chart showing a fourth example of a procedure (in cases where a reservation for a next radiation image recording operation has not been made). As in the examples of the procedures described above, the operations illustrated in FIGS. 5A and 5B are controlled principally by the controller 35.

FOURTH EXAMPLE OF A PROCEDURE

In Cases Where a Reservation for a Next Radiation Image Recording Operation Has Not Been Made The step (1) to the step (4A-3) illustrated in FIGS. 5A and 5B are basically identical with the step (1) to the step (4A-3) of the third example of the procedure described above. Also, the step (5) to the step (9) illustrated in FIGS. 5A and 5B are basically identical with the step (5) to the step (9) of the second example of the procedure described above.

In the fourth example of the procedure, after the step (9) has been performed, the residual image signal removing section 60 receives a radiation image signal Gs42, which has been acquired in the step (9), a residual image signal Gz4, which has been acquired in the step (5), the information representing an elapsed period T4, which has been measured by the elapsed period measuring section 50, and the information representing the residual image decay rate in accordance with the elapsed period T4, which information has been stored in the decay rate storing section 55. In accordance with the received pieces of information, the residual image signal removing section 60 acquires the residual image-free radiation image signal Gj4, which represents the radiation image of the object M1 and which is free from the residual image signal representing the residual image having decayed in accordance with the elapsed period.

In the embodiments described above, the maximum value of the values of the residual image signal Gz is employed as the representative value of the residual image signal Gz. Alternatively, for example, a maximum value of values of a processed residual image signal, which is obtained from running mean processing performed on the residual image signal Gz for removing high frequency components, may be employed as the representative value of the residual image signal Gz. As another alternative, a value of a residual image signal component corresponding to a frequency of occurrence, at which a cumulative frequency of occurrence taken from a maximum value side with respect to a total frequency of occurrence of a histogram constituted of the values of the residual image signal components of the residual image signal Gz is 10% of the total frequency of occurrence, may be employed as the representative value of the residual image signal Gz.

The directions of the upward and downward movements of the radiation image read-out section 20 and the erasing section 15 performed by the vertical movement actuating section 31 are not limited to the directions described above and may be set arbitrarily for the read-out operations and the erasing operation.

Figure 6:
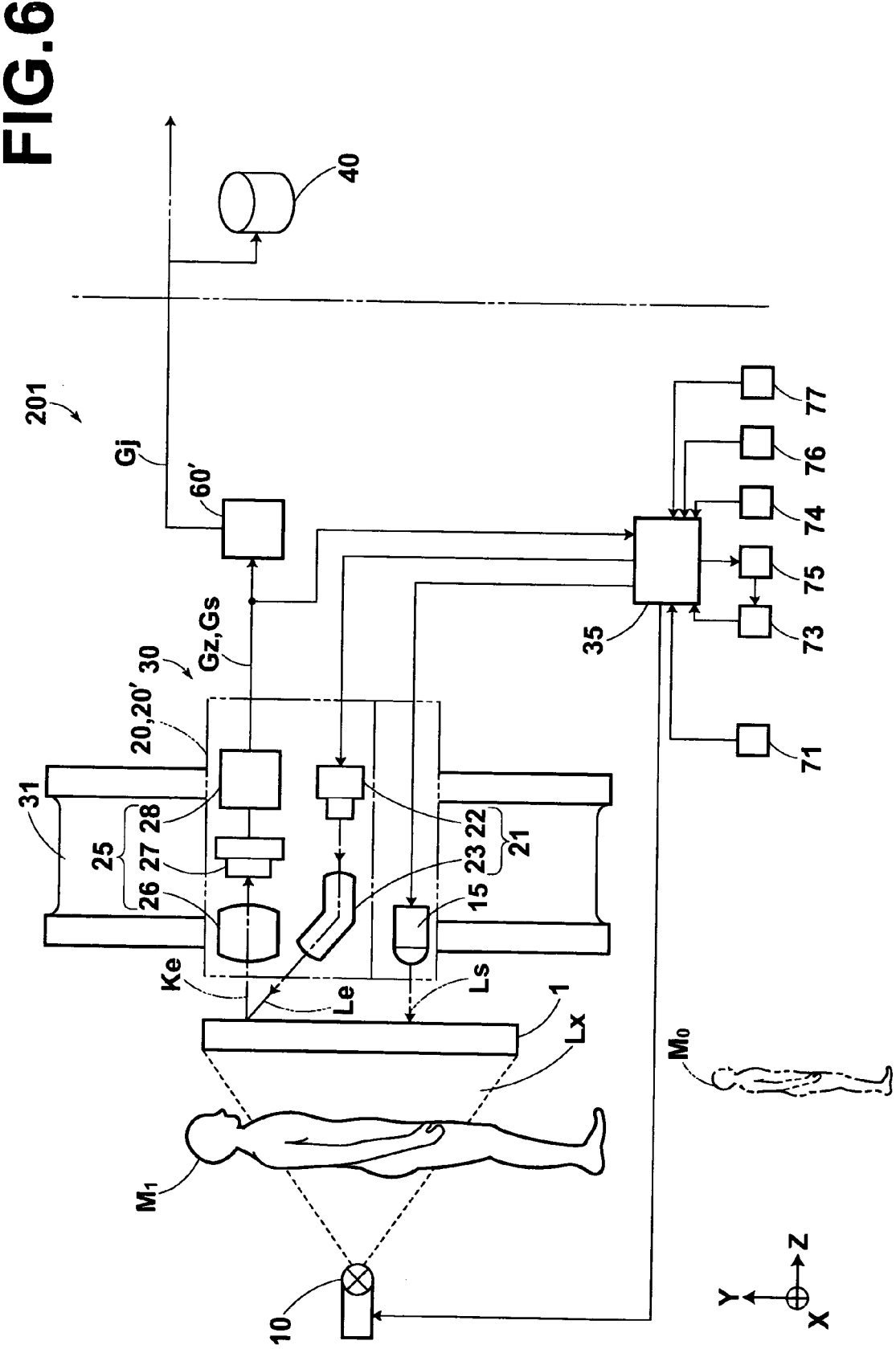
FIG. 6 is a schematic view showing a different embodiment of the radiation image recording and read-out system in accordance with the present invention.

Also, the elapsed period measuring section 50 and the decay rate storing section 55 may be omitted from the radiation image recording and read-out system 200, and a radiation image recording and read-out system 201 illustrated in FIG. 6 may thus be constituted. In the radiation image recording and read-out system 201, a residual image signal removing section 60' receives a residual image signal Gz, which represents a residual image, and a radiation image signal Gs, which represents the radiation image of the object M1 and has been acquired with the radiation image read-out operation performed by the radiation image read-out section 20 and on the stimulable phosphor sheet 1 having been subjected to the radiation image recording operation performed by the radiation image recording section 10 for recording the radiation image of the object M1 on the stimulable phosphor sheet 1 having been subjected to the residual image read-out operation, the radiation image signal Gs containing the residual image signal, which represents the residual image. The residual image signal removing section 60' receives the residual image signal Gz and the radiation image signal Gs directly from the radiation image read-out section 20. The residual image signal removing section 60' also subtracts the residual image signal Gz from the radiation image signal Gs in order to acquire a residual image-free radiation image signal Gj, which represents the radiation image of the object M1 and which is free from the residual image signal representing the residual image. The other constitutions and the other operations of the radiation image recording and read-out system 201 are the same as those in the radiation image recording and read-out system 200 described above.

The controller 35 need not necessarily perform all of the control operation 1 to the control operation 6 described above. Alternatively, the controller 35 may perform only several control operations among the control operation 1 to the control operation 6. As another alternative, the controller 35 may not perform the control operation 1 to the control operation 6. In such cases, approximately as in the embodiments described above, the effects of removing the residual image signal from the radiation image signal representing the radiation image of the object without the image quality of the reproduced radiation image becoming bad are capable of being obtained.

Each of the radiation image recording and read-out system 200 and the radiation image recording and read-out system 201 need not necessarily be provided with all of the reservation detecting section 71, the update period storing section 73, the image recording operation detecting section 74, the update period setting section 75, the erasing demand threshold value storing section 76, and the residual image threshold value storing section 77. Alternatively, each of the radiation image recording and read-out system 200 and the radiation image recording and read-out system 201 may be provided with only several sections among the above-enumerated sections. As another alternative, each of the radiation image recording and read-out system 200 and the radiation image recording and read-out system 201 may not be provided with the above-enumerated sections. In such cases, approximately as in the embodiments described above, the effects of removing the residual image signal from the radiation image signal representing the radiation image of the object without the image quality of the reproduced radiation image becoming bad are capable of being obtained.

What is claimed is:

1. A radiation image recording and read-out method for use in a radiation image recording and read-out system, in which a radiation image recording operation for recording a radiation image of an object, a radiation image read-out operation, and an erasing operation are performed iterately on an identical stimulable phosphor sheet, the method comprising the steps of:
    i) performing a residual image read-out operation on the stimulable phosphor sheet, which has been subjected to the erasing operation, a residual image signal, which represents a residual image remaining on the stimulable phosphor sheet after the stimulable phosphor sheet has been subjected to the erasing operation, being thereby acquired,
    ii) performing a radiation image recording operation for recording a radiation image of an object on the stimulable phosphor sheet, which has been subjected to the residual image read-out operation,
    iii) performing a radiation image read-out operation on the stimulable phosphor sheet, on which the radiation image of the object has been recorded, a radiation image signal, which represents the radiation image of the object, being thereby acquired, the thus acquired radiation image signal containing a residual image signal, which represents the residual image, and
    iv) subtracting the residual image signal, which represents the residual image, from the radiation image signal, which represents the radiation image of the object and which contains the residual image signal, whereby a radiation image signal, which represents the radiation image of the object and which is free from the residual image signal, is acquired.

2. A method as defined in claim 1 wherein the radiation image read-out operation and the residual image read-out operation are performed with single same read-out means.

3. A method as defined in claim 1 wherein a detection is made as to whether a reservation for a next radiation image recording operation has or has not been made,
    the erasing operation is performed for a short length of time in cases where it has been detected that the reservation for the next radiation image recording operation has been made, and
    the erasing operation is performed for a long length of time, which is longer than the short length of time, in cases where it has been detected that the reservation for the next radiation image recording operation has not been made.

4. A method as defined in claim 1 wherein a detection is made as to whether a reservation for a next radiation image recording operation has or has not been made,
    the erasing operation is ceased midway in cases where it has been detected during the erasing operation that the reservation for the next radiation image recording operation has been made, and
    the residual image read-out operation is performed on the stimulable phosphor sheet, for which the erasing operation has been ceased midway.

5. A method as defined in claim 1 wherein an elapsed period, which has elapsed after the residual image read-out operation was performed on the stimulable phosphor sheet, is measured,
    information representing a predetermined update period for the updating of the residual image signal, which represents the residual image, is stored,
    a detection is made as to whether a radiation image recording operation has or has not been performed after the residual image read-out operation was performed on the stimulable phosphor sheet, and
    the residual image read-out operation is again performed on the stimulable phosphor sheet when the elapsed period, which has elapsed after the residual image read-out operation was performed on the stimulable phosphor sheet and which has been measured, has become longer than the predetermined update period, which is stored, in cases where it has been detected that the radiation image recording operation has not been performed after the residual image read-out operation was performed on the stimulable phosphor sheet, whereby the residual image signal, which represents the residual image, is updated.

6. A method as defined in claim 5 wherein the predetermined update period, which is to be stored, is set to be long as a representative value of the residual image signal, which represents the residual image, becomes large.

7. A method as defined in claim 6 wherein the representative value of the residual image signal, which represents the residual image, is a value of a residual image signal component corresponding to a rank, at which a cumulative frequency of occurrence taken from a maximum value side with respect to a total frequency of occurrence of a histogram constituted of the values of the residual image signal components of the residual image signal is equal to a predetermined frequency of occurrence.

8. A method as defined in claim 6 wherein the representative value of the residual image signal, which represents the residual image, is a maximum value of a processed residual image signal, which is acquired with running mean processing of the residual image signal and removal of high frequency components.

9. A method as defined in claim 1 wherein information representing an erasing demand threshold value, which acts as a criterion for a demand for the erasing operation, is stored, and the erasing operation is performed in cases where a representative value of the residual image signal, which represents the residual image and has been acquired with the residual image read-out operation performed on the stimulable phosphor sheet, is equal to at least the erasing demand threshold value, which is stored.

10. A method as defined in claim 9 wherein the representative value of the residual image signal, which represents the residual image, is a value of a residual image signal component corresponding to a rank, at which a cumulative frequency of occurrence taken from a maximum value side with respect to a total frequency of occurrence of a histogram constituted of the values of the residual image signal components of the residual image signal is equal to a predetermined frequency of occurrence.

11. A method as defined in claim 9 wherein the representative value of the residual image signal, which represents the residual image, is a maximum value of a processed residual image signal, which is acquired with running mean processing of the residual image signal and removal of high frequency components.

12. A method as defined in claim 1 wherein information representing a residual image threshold value, which acts as a criterion for omission of the operation for removing the residual image signal, is stored, and the operation for removing the residual image signal is omitted in cases where a representative value of the residual image signal, which represents the residual image and has been acquired with the residual image read-out operation performed on the stimulable phosphor sheet, is smaller than the residual image threshold value, which is stored.

13. A method as defined in claim 1 wherein a length of time of the erasing operation, and/or the erasing demand threshold value, and/or the residual image threshold value, and/or the update period is altered in accordance with radiation image recording conditions employed in a next radiation image recording operation.

14. A radiation image recording and read-out method for use in a radiation image recording and read-out system, in which a radiation image recording operation for recording a radiation image of an object, a radiation image read-out operation, and an erasing operation are performed iterately on an identical stimulable phosphor sheet, the method comprising the steps of:

i) performing a residual image read-out operation on the stimulable phosphor sheet, which has been subjected to the erasing operation, a residual image signal, which represents a residual image remaining on the stimulable phosphor sheet after the stimulable phosphor sheet has been subjected to the erasing operation, being thereby acquired, ii) performing a radiation image recording operation for recording a radiation image of an object on the stimulable phosphor sheet, which has been subjected to the residual image read-out operation, iii) performing a radiation image read-out operation on the stimulable phosphor sheet, on which the radiation image of the object has been recorded, a radiation image signal, which represents the radiation image of the object, being thereby acquired, the thus acquired radiation image signal containing a residual image signal, which represents the residual image, iv) measuring an elapsed period that has elapsed between when the residual image read-out operation was performed on the stimulable phosphor sheet, which had been subjected to the erasing operation, and when the radiation image read-out operation is performed on the stimulable phosphor sheet, which has been subjected to the radiation image recording operation for recording the radiation image of the object on the stimulable phosphor sheet having been subjected to the residual image read-out operation, v) storing information, which represents a residual image decay rate representing a rate of decay of the residual image on the stimulable phosphor sheet, vi) multiplying the residual image signal, which has been acquired with the residual image read-out operation, by the residual image decay rate, which has been stored and takes a value in accordance with the elapsed period having been measured, and vii) subtracting the residual image signal, which has been acquired with the multiplication by the residual image decay rate, from the radiation image signal, which represents the radiation image of the object and has been acquired with the radiation image read-out operation performed on the stimulable phosphor sheet having been subjected to the radiation image recording operation for recording the radiation image of the object on the stimulable phosphor sheet having been subjected to the residual image read-out operation, the radiation image signal containing a residual image signal, which represents the residual image having decayed in accordance with the elapsed period, whereby a radiation image signal, which represents the radiation image of the object and which is free from the residual image signal representing the residual image having decayed, is acquired.

15. A method as defined in claim 14 wherein the radiation image read-out operation and the residual image read-out operation are performed with single same read-out means.

16. A method as defined in claim 14 wherein a detection is made as to whether a reservation for a next radiation image recording operation has or has not been made, the erasing operation is performed for a short length of time in cases where it has been detected that the reservation for the next radiation image recording operation has been made, and the erasing operation is performed for a long length of time, which is longer than the short length of time, in cases where it has been detected that the reservation for the next radiation image recording operation has not been made.

17. A method as defined in claim 14 wherein a detection is made as to whether a reservation for a next radiation image recording operation has or has not been made, the erasing operation is ceased midway in cases where it has been detected during the erasing operation that the reservation for the next radiation image recording operation has been made, and the residual image read-out operation is performed on the stimulable phosphor sheet, for which the erasing operation has been ceased midway.

18. A method as defined in claim 14 wherein an elapsed period, which has elapsed after the residual image read-out operation was performed on the stimulable phosphor sheet, is measured, information representing a predetermined update period for the updating of the residual image signal, which represents the residual image, is stored, a detection is made as to whether a radiation image recording operation has or has not been performed after the residual image read-out operation was performed on the stimulable phosphor sheet, and the residual image read-out operation is again performed on the stimulable phosphor sheet when the elapsed period, which has elapsed after the residual image read-out operation was performed on the stimulable phosphor sheet and which has been measured, has become longer than the predetermined update period, which is stored, in cases where it has been detected that the radiation image recording operation has not been performed after the residual image read-out operation was performed on the stimulable phosphor sheet, whereby the residual image signal, which represents the residual image, is updated.

19. A method as defined in claim 18 wherein the predetermined update period, which is to be stored, is set to be long as a representative value of the residual image signal, which represents the residual image, becomes large.

20. A method as defined in claim 19 wherein the representative value of the residual image signal, which represents the residual image, is a value of a residual image signal component corresponding to a rank, at which a cumulative frequency of occurrence taken from a maximum value side with respect to a total frequency of occurrence of a histogram constituted of the values of the residual image signal components of the residual image signal is equal to a predetermined frequency of occurrence.

21. A method as defined in claim 19 wherein the representative value of the residual image signal, which represents the residual image, is a maximum value of a processed residual image signal, which is acquired with running mean processing of the residual image signal and removal of high frequency components.

22. A method as defined in claim 14 wherein information representing an erasing demand threshold value, which acts as a criterion for a demand for the erasing operation, is stored, and the erasing operation is performed in cases where a representative value of the residual image signal, which represents the residual image and has been acquired with the residual image read-out operation performed on the stimulable phosphor sheet, is equal to at least the erasing demand threshold value, which is stored.

23. A method as defined in claim 22 wherein the representative value of the residual image signal, which represents the residual image, is a value of a residual image signal component corresponding to a rank, at which a cumulative frequency of occurrence taken from a maximum value side with respect to a total frequency of occurrence of a histogram constituted of the values of the residual image signal components of the residual image signal is equal to a predetermined frequency of occurrence.

24. A method as defined in claim 22 wherein the representative value of the residual image signal, which represents the residual image, is a maximum value of a processed residual image signal, which is acquired with running mean processing of the residual image signal and removal of high frequency components.

25. A method as defined in claim 14 wherein information representing a residual image threshold value, which acts as a criterion for omission of the operation for removing the residual image signal, is stored, and the operation for removing the residual image signal is omitted in cases where a representative value of the residual image signal, which represents the residual image and has been acquired with the residual image read-out operation performed on the stimulable phosphor sheet, is smaller than the residual image threshold value, which is stored.

26. A method as defined in claim 14 wherein a length of time of the erasing operation, and/or the erasing demand threshold value, and/or the residual image threshold value, and/or the update period is altered in accordance with radiation image recording conditions employed in a next radiation image recording operation.

27. A radiation image recording and read-out system, comprising:

i) radiation image recording means for performing a radiation image recording operation for recording a radiation image of an object on a stimulable phosphor sheet, ii) radiation image read-out means for performing a radiation image read-out operation on the stimulable phosphor sheet, on which the radiation image of the object has been recorded, and thereby acquiring a radiation image signal, which represents the radiation image of the object, and iii) erasing means for performing an erasing operation on the stimulable phosphor sheet, which has been subjected to the radiation image read-out operation performed by the radiation image read-out means, the radiation image recording operation, the radiation image read-out operation, and the erasing operation being performed iteratively on the identical stimulable phosphor sheet, wherein the improvement comprises the provision of:

a) residual image read-out means for performing a residual image read-out operation on the stimulable phosphor sheet, which has been subjected to the erasing operation performed by the erasing means, and thereby acquiring a residual image signal, which represents a residual image remaining on the stimulable phosphor sheet after the stimulable phosphor sheet has been subjected to the erasing operation, and b) residual image signal removing means for operating such that:

the residual image signal removing means receives the residual image signal, which represents the residual image and has been acquired with the residual image read-out means, and the radiation image signal, which represents the radiation image of the object and has been acquired with the radiation image read-out operation performed by the radiation image read-out means and on the stimulable phosphor sheet having been subjected to the radiation image recording operation performed by the radiation image recording means for recording the radiation image of the object on the stimulable phosphor sheet having been subjected to the residual image read-out operation, the radiation image signal containing the residual image signal, which represents the residual image, and the residual image signal removing means subtracts the residual image signal, which represents the residual image, from the radiation image signal, which represents the radiation image of the object and which contains the residual image signal, in order to acquire a radiation image signal, which represents the radiation image of the object and which is free from the residual image signal.

28. A system as defined in claim 27 wherein the radiation image read-out means also acts as the residual image read-out means.

29. A system as defined in claim 27 wherein the system further comprises reservation detecting means for making a detection as to whether a reservation for a next radiation image recording operation has or has not been made, and
control means for controlling such that:
the erasing means performs the erasing operation for a short length of time in cases where it has been detected by the reservation detecting means that the reservation for the next radiation image recording operation has been made, and
the erasing means performs the erasing operation for a long length of time, which is longer than the short length of time, in cases where it has been detected by the reservation detecting means that the reservation for the next radiation image recording operation has not been made.

30. A system as defined in claim 27 wherein the system further comprises reservation detecting means for making a detection as to whether a reservation for a next radiation image recording operation has or has not been made, and
control means for controlling such that:
the erasing operation is ceased midway in cases where it has been detected by the reservation detecting means during the erasing operation, which is being performed by the erasing means, that the reservation for the next radiation image recording operation has been made, and
the residual image read-out means performs the residual image read-out operation on the stimulable phosphor sheet, for which the erasing operation has been ceased midway.

31. A system as defined in claim 27 wherein the system further comprises period measuring means for measuring an elapsed period, which has elapsed after the residual image read-out operation was performed by the residual image read-out means and on the stimulable phosphor sheet,
update period storing means for storing information representing a predetermined update period for the updating of the residual image signal, which represents the residual image,
image recording operation detecting means for making a detection as to whether a radiation image recording operation has or has not been performed by the radiation image recording means after the residual image read-out operation was performed by there sidual image read-out means and on the stimulable phosphor sheet, and
control means for controlling such that:
the residual image read-out means again performs the residual image read-out operation on the stimulable phosphor sheet when the elapsed period, which has elapsed after the residual image read-out operation was performed on the stimulable phosphor sheet and which has been measured by the period measuring means, has become longer than the predetermined update period, which is stored in the update period storing means, in cases where it has been detected by the image recording operation detecting means that the radiation image recording operation has not been performed after the residual image read-out operation was performed on the stimulable phosphor sheet, whereby the residual image signal, which represents the residual image, is updated.

32. A system as defined in claim 31 wherein the system further comprises update period setting means for setting the predetermined update period, which is to be stored in the update period storing means, and
the update period setting means sets the update period to be long as a representative value of the residual image signal, which represents the residual image and has been acquired with the residual image read-out means, becomes large.

33. A system as defined in claim 32 wherein the representative value of the residual image signal, which represents the residual image, is a value of a residual image signal component corresponding to a rank, at which a cumulative frequency of occurrence taken from a maximum value side with respect to a total frequency of occurrence of a histogram constituted of the values of the residual image signal components of the residual image signal is equal to a predetermined frequency of occurrence.

34. A system as defined in claim 32 wherein the representative value of the residual image signal, which represents the residual image, is a maximum value of a processed residual image signal, which is acquired with running mean processing of the residual image signal and removal of high frequency components.

35. A system as defined in claim 27 wherein the system further comprises erasing demand threshold value storing means for storing information representing an erasing demand threshold value, which acts as a criterion for a demand for the erasing operation performed by the erasing means, and
control means for controlling such that:
the erasing means performs the erasing operation in cases where a representative value of the residual image signal, which represents the residual image and has been acquired with the residual image read-out operation performed by the residual image read-out means and on the stimulable phosphor sheet, is equal to at least the erasing demand threshold value, which is stored in the erasing demand threshold value storing means.

36. A system as defined in claim 35 wherein the representative value of the residual image signal, which represents the residual image, is a value of a residual image signal component corresponding to a rank, at which a cumulative frequency of occurrence taken from a maximum value side with respect to a total frequency of occurrence of a histogram constituted of the values of the residual image signal components of the residual image signal is equal to a predetermined frequency of occurrence.

37. A system as defined in claim 35 wherein the representative value of the residual image signal, which represents the residual image, is a maximum value of a processed residual image signal, which is acquired with running mean processing of the residual image signal and removal of high frequency components.

38. A system as defined in claim 27 wherein the system further comprises residual image threshold value storing means for storing information representing a residual image threshold value, which acts as a criterion for omission of the operation of the residual image signal removing means for removing the residual image signal, and control means for controlling such that:
the operation of the residual image signal removing means for removing the residual image signal is omitted in cases where a representative value of the residual image signal, which represents the residual image and has been acquired with the residual image read-out operation performed by the residual image read-out means and on the stimulable phosphor sheet, is smaller than the residual image threshold value, which is stored in the residual image threshold value storing means.

39. A system as defined in claim 27 wherein the system further comprises control means for altering a length of time of the erasing operation, and/or the erasing demand threshold value, and/or the residual image threshold value, and/or the update period in accordance with radiation image recording conditions employed in a next radiation image recording operation performed by the radiation image recording means.

40. A radiation image recording and read-out system, comprising:
i) radiation image recording means for performing a radiation image recording operation for recording a radiation image of an object on a stimulable phosphor sheet,
ii) radiation image read-out means for performing a radiation image read-out operation on the stimulable phosphor sheet, on which the radiation image of the object has been recorded, and thereby acquiring a radiation image signal, which represents the radiation image of the object, and
iii) erasing means for performing an erasing operation on the stimulable phosphor sheet, which has been subjected to the radiation image read-out operation performed by the radiation image read-out means,
the radiation image recording operation, the radiation image read-out operation, and the erasing operation being performed iterately on the identical stimulable phosphor sheet,
wherein the improvement comprises the provision of:
a) residual image read-out means for performing a residual image read-out operation on the stimulable phosphor sheet, which has been subjected to the erasing operation performed by the erasing means, and thereby acquiring a residual image signal, which represents a residual image remaining on the stimulable phosphor sheet after the stimulable phosphor sheet has been subjected to the erasing operation,
b) elapsed period measuring means for measuring an elapsed period that has elapsed between when the residual image read-out operation was performed by the residual image read-out means and on the stimulable phosphor sheet, which had been subjected to the erasing operation, and when the radiation image read-out operation is performed by the radiation image read-out means and on the stimulable phosphor sheet, which has been subjected to the radiation image recording operation performed by the radiation image recording means for recording the radiation image of the object on the stimulable phosphor sheet having been subjected to the residual image read-out operation performed by the residual image read-out means,
c) storage means for storing residual information, which represents a residual image decay rate representing a rate of decay of the residual image on the stimulable phosphor sheet, and
d) residual image signal removing means for operating such that:
the residual image signal removing means receives the residual image signal, which represents the residual image and has been acquired with the residual image read-out means, and the radiation image signal, which represents the radiation image of the object and has been acquired with the radiation image read-out operation performed by the radiation image read-out means and on the stimulable phosphor sheet having been subjected to the radiation image recording operation performed by the radiation image recording means for recording the radiation image of the object on the stimulable phosphor sheet having been subjected to the residual image read-out operation performed by the residual image read-out means, the radiation image signal containing the residual image signal, which represents the residual image having decayed in accordance with the elapsed period,
the residual image signal removing means multiplies the residual image signal, which has been acquired with the residual image read-out operation performed by the residual image read-out means, by the residual image decay rate, which has been stored in the storage means and takes a value in accordance with the elapsed period having been measured by the elapsed period measuring means, and
the residual image signal removing means subtracts the residual image signal, which has been acquired with the multiplication by the residual image decay rate, from the radiation image signal, which represents the radiation image of the object and has been acquired with the radiation image read-out operation performed by the radiation image read-out means, the radiation image signal containing a residual image signal, which represents the residual image having decayed in accordance with the elapsed period, in order to acquire a radiation image signal, which represents the radiation image of the object and which is free from the residual image signal representing the residual image having decayed.

41. A system as defined in claim 40 wherein the radiation image read-out means also acts as the residual image read-out means.

42. A system as defined in claim 40 wherein the system further comprises reservation detecting means for making a detection as to whether a reservation for a next radiation image recording operation has or has not been made, and
control means for controlling such that:
the erasing means performs the erasing operation for a short length of time in cases where it has been detected by the reservation detecting means that the reservation for the next radiation image recording operation has been made, and
the erasing means performs the erasing operation for a long length of time, which is longer than the short length of time, in cases where it has been detected by the reservation detecting means that the reservation for the next radiation image recording operation has not been made.

43. A system as defined in claim 40 wherein the system further comprises reservation detecting means for making a detection as to whether a reservation for a next radiation image recording operation has or has not been made, and
control means for controlling such that:
the erasing operation is ceased midway in cases where it has been detected by the reservation detecting means during the erasing operation, which is being performed by the erasing means, that the reservation for the next radiation image recording operation has been made, and
the residual image read-out means performs the residual image read-out operation on the stimulable phosphor sheet, for which the erasing operation has been ceased midway.

44. A system as defined in claim 40 wherein the system further comprises period measuring means for measuring an elapsed period, which has elapsed after the residual image read-out operation was performed by the residual image read-out means and on the stimulable phosphor sheet,
update period storing means for storing information representing a predetermined update period for the updating of the residual image signal, which represents the residual image,
image recording operation detecting means for making a detection as to whether a radiation image recording operation has or has not been performed by the radiation image recording means after the residual image read-out operation was performed by the residual image read-out means and on the stimulable phosphor sheet, and
control means for controlling such that:
the residual image read-out means again performs the residual image read-out operation on the stimulable phosphor sheet when the elapsed period, which has elapsed after the residual image read-out operation was performed on the stimulable phosphor sheet and which has been measured by the period measuring means, has become longer than the predetermined update period, which is stored in the update period storing means, in cases where it has been detected by the image recording operation detecting means that the radiation image recording operation has not been performed after the residual image read-out operation was performed on the stimulable phosphor sheet, whereby the residual image signal, which represents the residual image, is updated.

45. A system as defined in claim 44 wherein the system further comprises update period setting means for setting the predetermined update period, which is to be stored in the update period storing means, and
the update period setting means sets the update period to be long as a representative value of the residual image signal, which represents the residual image and has been acquired with the residual image read-out means, becomes large.

46. A system as defined in claim 45 wherein the representative value of the residual image signal, which represents the residual image, is a value of a residual image signal component corresponding to a rank, at which a cumulative frequency of occurrence taken from a maximum value side with respect to a total frequency of occurrence of a histogram constituted of the values of the residual image signal components of the residual image signal is equal to a predetermined frequency of occurrence.

47. A system as defined in claim 45 wherein the representative value of the residual image signal, which represents the residual image, is a maximum value of a processed residual image signal, which is acquired with running mean processing of the residual image signal and removal of high frequency components.

48. A system as defined in claim 40 wherein the system further comprises erasing demand threshold value storing means for storing information representing an erasing demand threshold value, which acts as a criterion for a demand for the erasing operation performed by the erasing means, and
control means for controlling such that:
the erasing means performs the erasing operation in cases where a representative value of the residual image signal, which represents the residual image and has been acquired with the residual image read-out operation performed by the residual image read-out means and on the stimulable phosphor sheet, is equal to at least the erasing demand threshold value, which is stored in the erasing demand threshold value storing means.

49. A system as defined in claim 48 wherein the representative value of the residual image signal, which represents the residual image, is a value of a residual image signal component corresponding to a rank, at which a cumulative frequency of occurrence taken from a maximum value side with respect to a total frequency of occurrence of a histogram constituted of the values of the residual image signal components of the residual image signal is equal to a predetermined frequency of occurrence.

50. A system as defined in claim 48 wherein the representative value of the residual image signal, which represents the residual image, is a maximum value of a processed residual image signal, which is acquired with running mean processing of the residual image signal and removal of high frequency components.

51. A system as defined in claim 40 wherein the system further comprises residual image threshold value storing means for storing information representing a residual image threshold value, which acts as a criterion for omission of the operation of the residual image signal removing means for removing the residual image signal, and
control means for controlling such that:
the operation of the residual image signal removing means for removing the residual image signal is omitted in cases where a representative value of the residual image signal, which represents the residual image and has been acquired with the residual image read-out operation performed by the residual image read-out means and on the stimulable phosphor sheet, is smaller than the residual image threshold value, which is stored in the residual image threshold value storing means.

52. A system as defined in claim 40 wherein the system further comprises control means for altering a length of time of the erasing operation, and/or the erasing demand threshold value, and/or the residual image threshold value, and/or the update period in accordance with radiation image recording conditions employed in a next radiation image recording operation performed by the radiation image recording means.

* * * * *